US011516496B2

(12) United States Patent
Lim et al.

(10) Patent No.: US 11,516,496 B2
(45) Date of Patent: Nov. 29, 2022

(54) IMAGE ENCODING/DECODING METHOD AND APPARATUS, AND RECORDING MEDIUM STORING BITSTREAM

(71) Applicant: Electronics and Telecommunications Research Institute, Daejeon (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 16/982,972

(22) PCT Filed: Mar. 21, 2019

(86) PCT No.: PCT/KR2019/003324
§ 371 (c)(1),
(2) Date: Dec. 23, 2020

(87) PCT Pub. No.: WO2019/182385
PCT Pub. Date: Sep. 26, 2019

(65) Prior Publication Data
US 2021/0120261 A1 Apr. 22, 2021

(30) Foreign Application Priority Data
Mar. 21, 2018 (KR) .................. 10-2018-0032687
Sep. 19, 2018 (KR) .................. 10-2018-0112519

(51) Int. Cl.
H04N 19/96 (2014.01)
H04N 19/105 (2014.01)
(Continued)

(52) U.S. Cl.
CPC ......... *H04N 19/513* (2014.11); *H04N 19/105* (2014.11); *H04N 19/159* (2014.11);
(Continued)

(58) Field of Classification Search
CPC .. H04N 19/105; H04N 19/159; H04N 19/176; H04N 19/423; H04N 19/513;
(Continued)

(56) References Cited

U.S. PATENT DOCUMENTS 9,866,848 B2    1/2018  Chuang et al.
9,924,180 B2    3/2018  Lee et al.
(Continued)

FOREIGN PATENT DOCUMENTS

KR          100772576 B1    11/2007
KR       1020130129470 A    11/2013
(Continued)

*Primary Examiner* — Anner N Holder
(74) *Attorney, Agent, or Firm* — William Park & Associates Ltd.

(57) ABSTRACT

The present invention is about an image encoding/decoding method and apparatus. According to present invention, a method of decoding an image, the method comprising, loading information of a neighboring block of a current block; decoding a current block using the loaded information of the neighboring block; and saving information of the current block that is decoded.

18 Claims, 15 Drawing Sheets

(51) Int. Cl.
*H04N 19/159* (2014.01)
*H04N 19/176* (2014.01)
*H04N 19/423* (2014.01)
*H04N 19/513* (2014.01)

(52) U.S. Cl.
CPC ......... *H04N 19/176* (2014.11); *H04N 19/423* (2014.11); *H04N 19/96* (2014.11)

(58) Field of Classification Search
CPC .... H04N 19/96; H04N 19/124; H04N 19/167; H04N 19/184; H04N 19/196; H04N 19/426; H04N 19/50; H04N 19/60
See application file for complete search history.

(56) References Cited

U.S. PATENT DOCUMENTS

| | | | |
|---|---|---|---|
| 2010/0150242 A1* | 6/2010 | Ozawa | H04N 19/70 375/240.16 |
| 2013/0022119 A1* | 1/2013 | Chien | H04N 19/176 375/240.16 |
| 2013/0343461 A1 | 12/2013 | Lee et al. | |
| 2014/0161186 A1* | 6/2014 | Zhang | H04N 19/52 375/240.16 |
| 2016/0198175 A1* | 7/2016 | Shima | H04N 19/172 375/240.12 |
| 2017/0150144 A1 | 5/2017 | Chaudhari et al. | |
| 2018/0070092 A1 | 3/2018 | Kim et al. | |
| 2018/0070097 A1* | 3/2018 | Arakage | H04N 19/50 |
| 2018/0270500 A1* | 9/2018 | Li | H04N 19/54 |
| 2019/0082191 A1* | 3/2019 | Chuang | H04N 19/119 |
| 2019/0281285 A1* | 9/2019 | Piao | H04N 19/129 |

FOREIGN PATENT DOCUMENTS

| | | |
|---|---|---|
| KR | 1020140017015 A | 2/2014 |
| KR | 1020140039082 A | 3/2014 |
| KR | 1020180029905 A | 3/2018 |
| WO | 2001086962 A1 | 11/2001 |
| WO | 2012163199 A1 | 12/2012 |
| WO | 2012167097 A1 | 12/2012 |
| WO | 2013012867 A2 | 1/2013 |

\* cited by examiner

IMAGE ENCODING/DECODING METHOD AND APPARATUS, AND RECORDING MEDIUM STORING BITSTREAM

TECHNICAL FIELD

The present invention relates to a method and apparatus for encoding/decoding an image and, more particularly, to a method and apparatus for encoding/decoding an image using information of neighboring blocks.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide an image encoding/decoding method and apparatus capable of improving compression efficiency, and a recording medium in which a bitstream generated by the method or apparatus is stored.

Another object of the present invention is to provide a method and apparatus for performing at least one operation selected from among bit depth reduction, storage space size reduction, and statistic value calculation when saving block information, thereby saving hardware resources and memory bandwidth, and to provide a recording medium in which a bitstream generated by the method or apparatus is stored.

A further object of the present invention is to provide a method of encoding or decoding an image by using information of neighboring blocks and a recording medium in which a bitstream generated by the method is stored.

A yet further object of the present invention is to provide a method and apparatus capable of reducing the consumption of or eliminating the necessity of a line buffer for storing information of neighboring blocks and to provide a recording medium in which a bitstream generated by the method or apparatus is stored.

Technical Solution

A method of decoding an image of the present invention may comprise, loading information of a neighboring block of a current block; decoding a current block using the loaded information of the neighboring block; and saving information of the current block that is decoded.

In the method of decoding an image of the present invention, loaded information is determined according to whether or not the neighboring block is present outside a row or column boundary of a coding tree unit (CTU) in which the current block is included.

In the method of decoding an image of the present invention, when the neighboring block is present outside the row or column boundary of the CTU in which the current block is included, the decoding is performed using only information of a neighboring block located inside the row or column boundary of the CTU.

In the method of decoding an image of the present invention, when the neighboring block is present outside the row or column boundary of the CTU in which the current block is included, information of a neighboring block that is present inside the row or column boundary of the CTU is used to replace the information of the neighboring block that is present outside the row or column boundary of the CTU and is used in the decoding of the current block.

In the method of decoding an image of the present invention, when the neighboring block is present outside the row or column boundary of the CTU in which the current block is included, the information of the neighboring block is set to a pre-defined value and the decoding is performed using the pre-defined value.

In the method of decoding an image of the present invention, when the decoding is performed in an intra prediction mode, the information of the neighboring block that is present outside the row or column boundary of the CTU is set to a value indicating planar mode.

In the method of decoding an image of the present invention, when the neighboring block is present outside the row or column boundary of the CTU in which the current block is included, the decoding is performed by using a resulting value produced by a predetermined inverse operation performed on the information of the neighboring block that is present outside the row or column boundary of the CTU.

In the method of decoding an image of the present invention, when the decoding is performed in an inter prediction mode and the information of the current block is a motion vector, a value of the motion vector is converted into a floating-point number and the floating-point number is saved.

In the method of decoding an image of the present invention, the motion vector is represented by 18 bits, and the saved floating-point number comprises 6 mantissa bits and 4 exponent bits.

when the decoding is performed in an inter prediction mode, the information of the current block is a scaled motion vector, and a value of the scaled motion vector is not within a predetermined range, the value of the scaled motion vector is changed to a maximum value or a minimum value of the predetermined range and the changed value of the scaled motion vector is saved.

In the method of decoding an image of the present invention, when the value of the scaled motion vector is smaller than the minimum value of the predetermined range, the value of the scaled motion vector is changed to the minimum value and is then saved.

In the method of decoding an image of the present invention, when the value of the scaled motion vector is greater than the maximum value of the predetermined range, the value of the scaled motion vector is changed to the maximum value and is then saved.

In the method of decoding an image of the present invention, the maximum value and the minimum value are −131072 and 131071, respectively.

In the method of decoding an image of the present invention, the information of the neighboring block is loaded from a line buffer or a memory.

In the method of decoding an image of the present invention, the information of the current block is saved in a line buffer or a memory.

In the method of encoding an image of the present invention may comprises loading information of a neighboring block of a current block; encoding the current block using the loaded information of the neighboring block; and saving information of the current block generated by the encoding of the current block.

In the non-temporary storage medium of the present invention, including a bitstream, generated by an image encoding method comprising loading information of a neighboring block of a current block, encoding the current block using the loaded information of the neighboring block, and saving information of the current block generated by the encoding of the current block.

Advantageous Effects

According to the present invention, it is possible to provide an image encoding/decoding method and apparatus capable of improving compression efficiency and to provide a recording medium in which a bitstream generated by the method or apparatus is stored.

According to the present invention, it is possible to provide a method and apparatus for performing at least one operation selected from among bit depth reduction, storage space size reduction, and statistic value calculation to save hardware resources and memory bandwidth and to provide a recording medium in which a bitstream generated by the method or apparatus is stored.

According to the present invention, it is possible to provide a method of encoding or decoding an image by using information of neighboring blocks and to provide a recording medium in which a bitstream generated by the method is stored.

According to the present invention, it is possible to provide a method and apparatus capable of reducing the consumption of or eliminating the necessity of a line buffer for storing information of neighboring blocks and to provide a recording medium in which a bitstream generated by the method or apparatus is stored.

MODE FOR INVENTION

Figure 1:
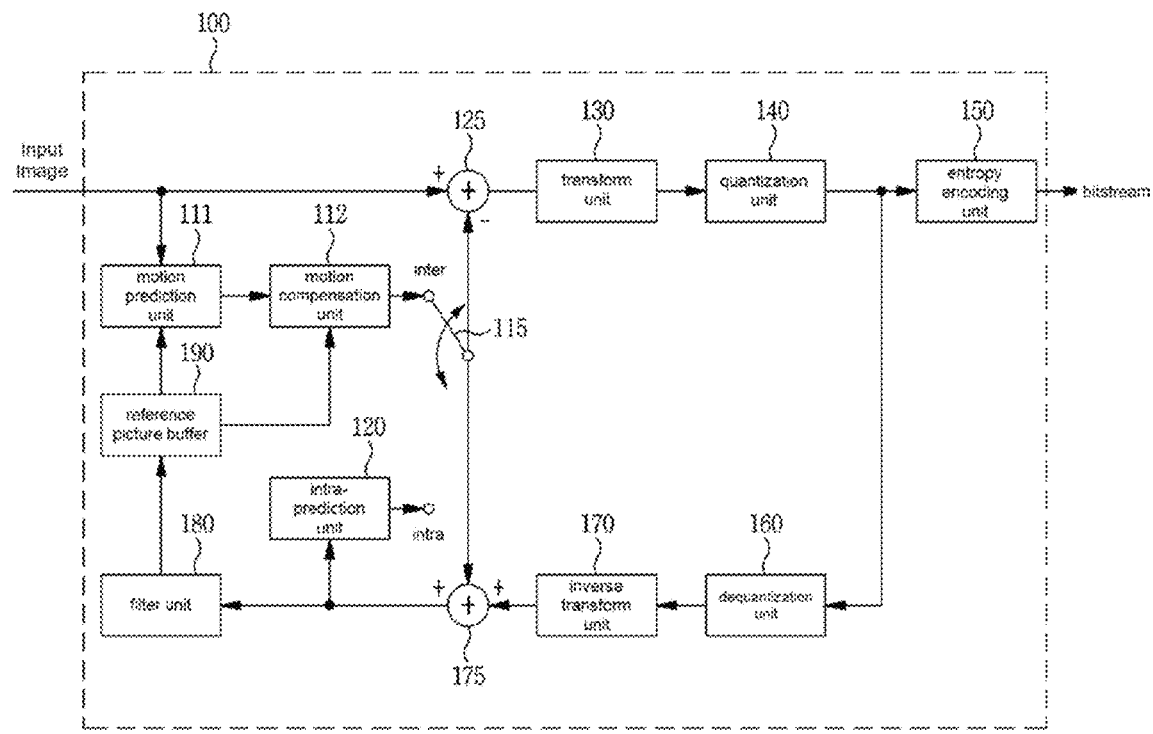
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component.

The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method, a ternary-tree partitioning method, etc. to configure a lower unit such as coding unit, prediction unit, transform unit, etc. It may be used as a term for designating a sample block that becomes a process unit when encoding/decoding an image as an input image. Here, a quad-tree may mean a quarternary-tree.

When the size of a coding block falls within a first predetermined range, only quad-tree partitioning is allowed for the coding block. Here, the first predetermined range may be defined by at least one of a maximum size and a minimum size of a coding block that can be partitioned only by quad-tree partitioning. Information indicating the maximum/minimum size of the coding block for which quad-tree partitioning is allowed may be signaled as data included in a bitstream, and the information may be signaled in units of at least one of a sequence, a picture parameter, a tile group, and a slice (segment). Alternatively, the maximum/minimum size of the coding block may be a fixed size preset in the encoder/decoder. For example, when the size of the coding block is within a range from 64×64 to 256×256, the coding block can be partitioned only by quad-tree partitioning. Alternatively, when the size of the coding block is larger than the maximum size of a transform block (TB), the coding block can be partitioned only by quad-tree partitioning. In this case, the block to be partitioned into quadrants may be either a coding block or a transform block. In this case, information (for example, split flag) indicating the quad-tree partitioning of a coding block may be a flag indicating whether or not the coding unit is partitioned by quad-tree partitioning. When the size of a coding block falls within a second predetermined range, the coding block can be partitioned only by binary-tree partitioning or ternary-tree partitioning. In this case, the above description of quad-tree partitioning can also be applied to binary-tree partitioning or ternary-tree partitioning.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a tile group, a slice header, and tile header information. In addition, the tile group may mean a group including a plurality of tiles and may have the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may mean a list including one or more reference pictures used for inter-picture prediction or motion compensation. LC (List Combined), L0 (List 0), L1 (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Prediction list utilization flag: may represent whether a prediction block is generated using at least one reference image included in a specific reference picture list. An inter prediction indicator may be derived using a prediction list utilization flag, and reversely, a prediction list utilization flag may be derived using an inter prediction indicator. For example, when a prediction list utilization flag indicates a first value of "0", it represents a prediction block is not generated using a reference picture included in the corresponding reference picture list. When a prediction list utilization flag indicates a second value of "1", it represents a prediction block is generated using a reference picture included in the corresponding reference picture list.

Reference Picture Index: may mean an index indicating a specific reference picture in a reference picture list.

Reference Picture: may mean a picture to which a specific block refers for inter-picture prediction or motion compensation. Alternatively, a reference picture may be a picture including a reference block referred to by a current block for inter prediction or motion compensation. Hereinafter, the term "reference picture" and "reference image" may be used as the same meaning and used interchangeably.

Motion Vector: is a two-dimensional vector used for inter-picture prediction or motion compensation and may mean an offset between a reference picture and an encoding/decoding target picture. For example, (mvX, mvY) may represent a motion vector, mvX may represent a horizontal component, and mvY may represent a vertical component.

Search Range: may be a 2-dimensional region where search for a motion vector during inter prediction is performed. For example, a size of a search range may be M×N. M and N may be a positive integer, respectively.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list configured using one or more motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: may mean a list composed of merge candidates.

Merge Candidate: may mean a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: may mean an indicator indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether to partition of a ternary-tree form, a partition direction of a ternary-tree form (horizontal direction or vertical direction), a partition form of a ternary-tree form (symmetric partition or asymmetric partition), whether to partition of a multi-type-tree form, a partition direction of a multi-type-tree form (horizontal direction or vertical direction), a partition form of a multi-type-tree form (symmetric partition or asymmetric partition), a partitioning tree of multi-type-tree form, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile group identification information, a tile group type, tile group partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
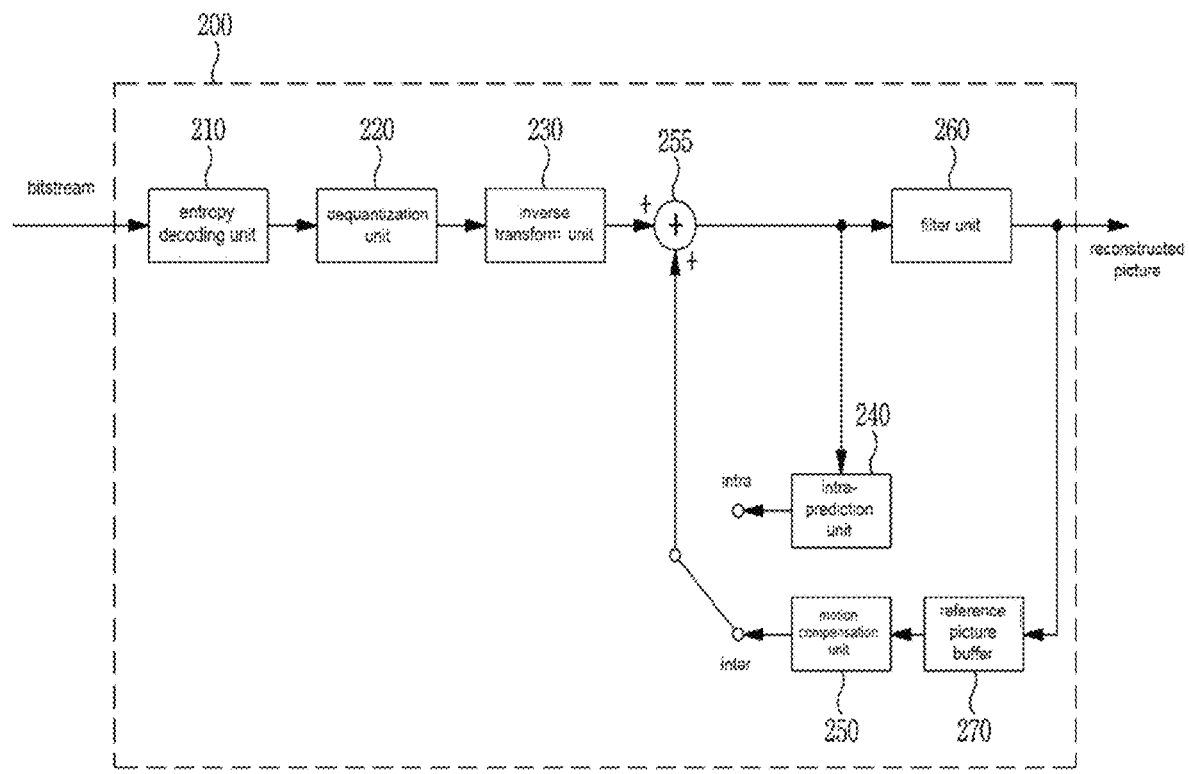
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
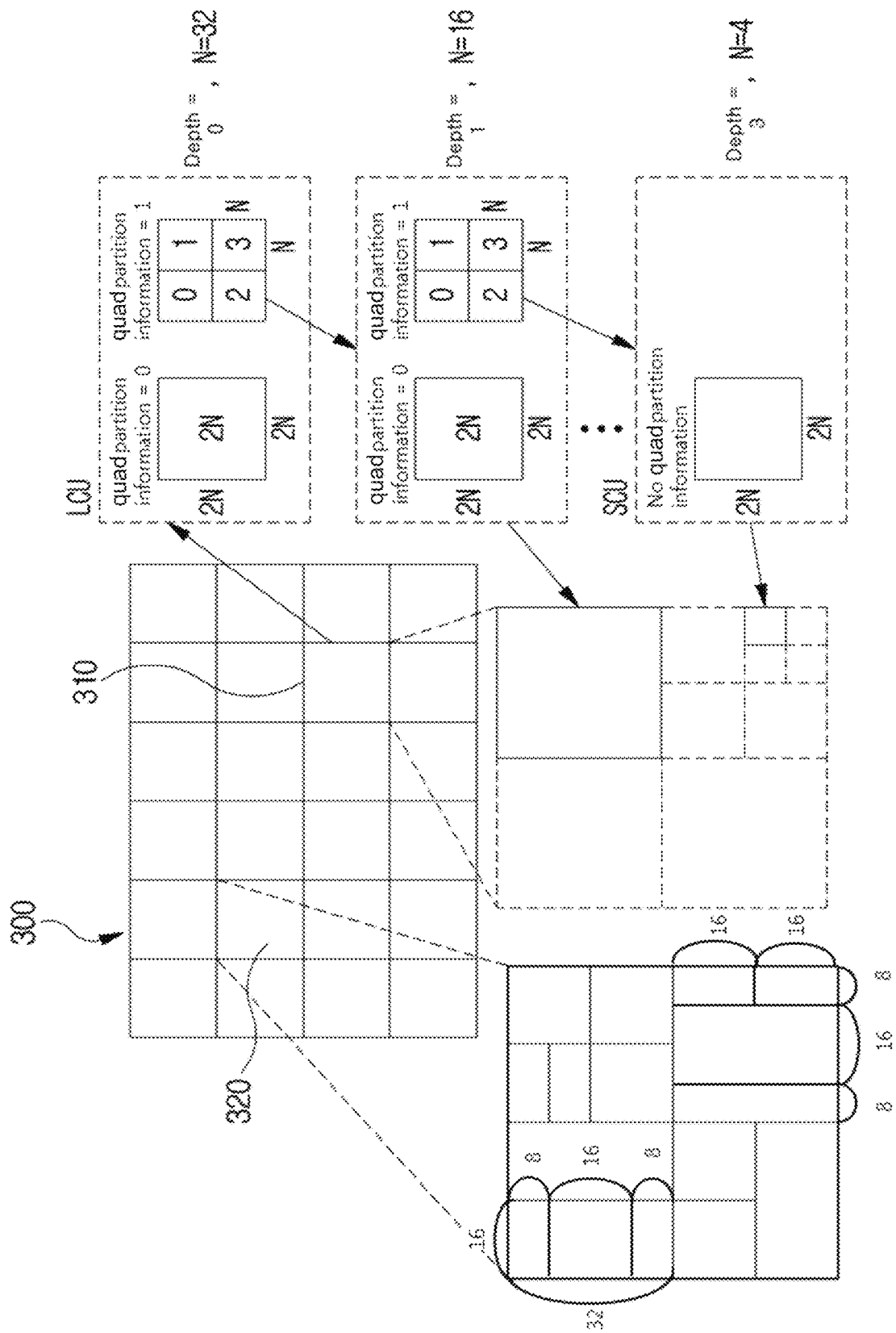
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within a CTU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of a CTU may be 0, and a depth of a smallest coding unit (SCU) may be a predefined maximum depth. Herein, the CTU may be a coding unit having a maximum coding unit size, and the SCU may be a coding unit having a minimum coding unit size as described above. Partitioning is started from the CTU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, a CTU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned (quad-tree partitioned) into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. For example, when a coding unit having a size of 8×32 is horizontally partitioned into two sub-coding units, each of the two sub-coding units may have a size of 8×16. When a single coding unit is partitioned into two coding units, it may be called that the coding unit is partitioned (binary-tree partitioned) in a binary-tree form.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-tree partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is partitioned by a multi-type tree partition structure, the coding unit may further include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is partitioned by a multi-type tree partition structure, the current coding unit may further include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quad-tree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bitstream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a tile level, a tile group level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra slice and an inter slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra slice, the maximum size of a ternary tree may be 32×32. For example, for an inter slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-tree partitioned or ternary-tree partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-tree partitioned or ternary-tree partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-tree partitioned and/or ternary-tree partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-tree partitioned and/or ternary-tree partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
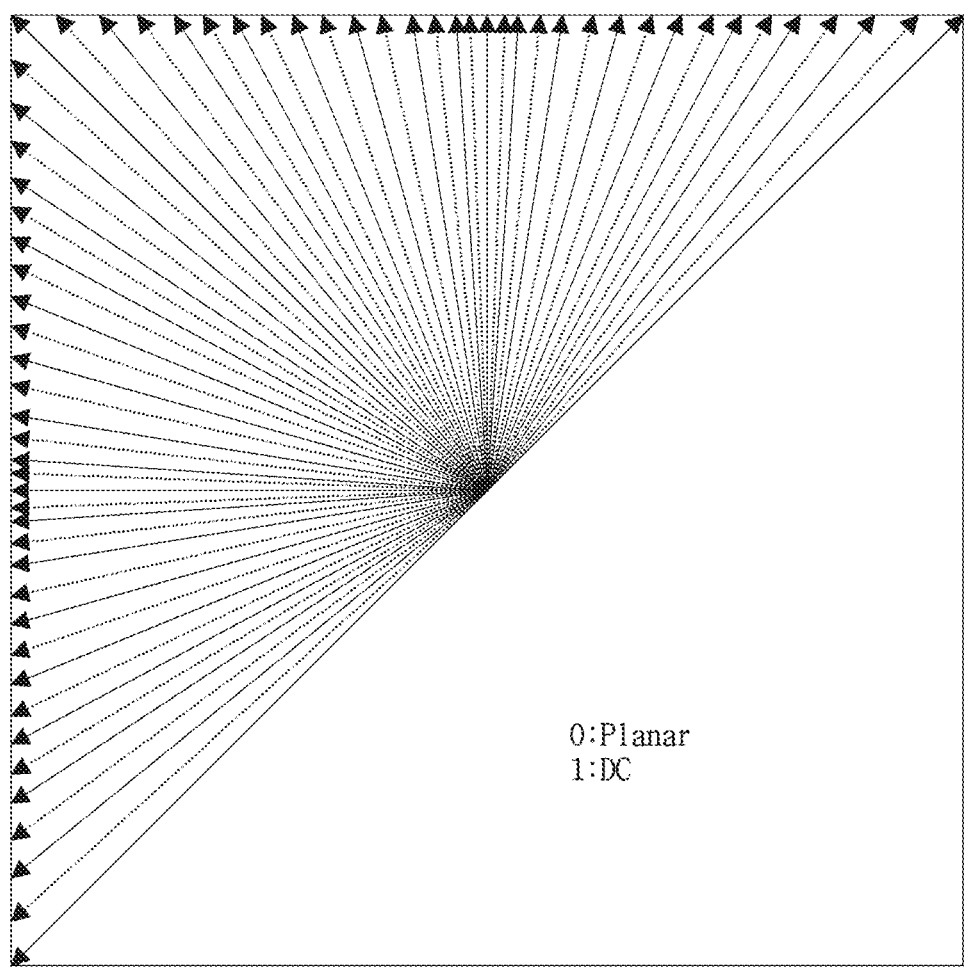
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size/shape.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
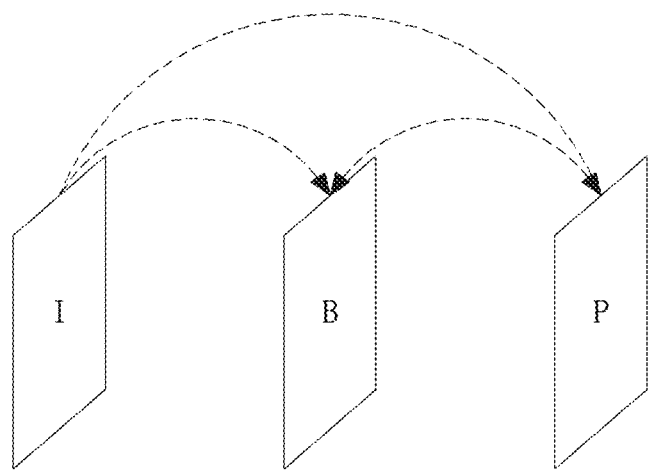
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Figure 6:
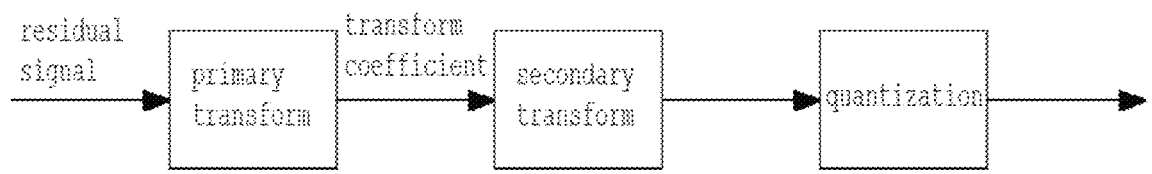
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, the transform scheme may be determined through signaling of transform information.

Since the residual signal is quantized through the primary transform and the secondary transform, a quantized-level signal (quantization coefficients) is generated. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Hereinafter, a method of encoding/decoding an image by using information of a neighboring block, according to the present invention, will be described with reference to the drawings.

The present invention relates to an image encoding/decoding method and apparatus using a line buffer, and a recording medium in which a bitstream generated by the method or apparatus is stored. The method and apparatus encodes/decodes a target image, according to any one of the embodiments described below.

Hereinafter, one embodiment in which the line buffer is a horizontal line buffer will be described. However, other embodiments of the present invention similarly work even with a vertical line buffer instead of the horizontal line buffer. That is, in the following description, the line buffer refers to a horizontal line buffer, a vertical line buffer, or both.

Hereinafter, a case where a specific piece of block information is used only in a specific process during encoding/decoding will be described, but the present invention is not limited to the case. Multiple pieces of block information or various combinations of multiple pieces of block information can be used in various processes during encoding/decoding.

Figure 7:
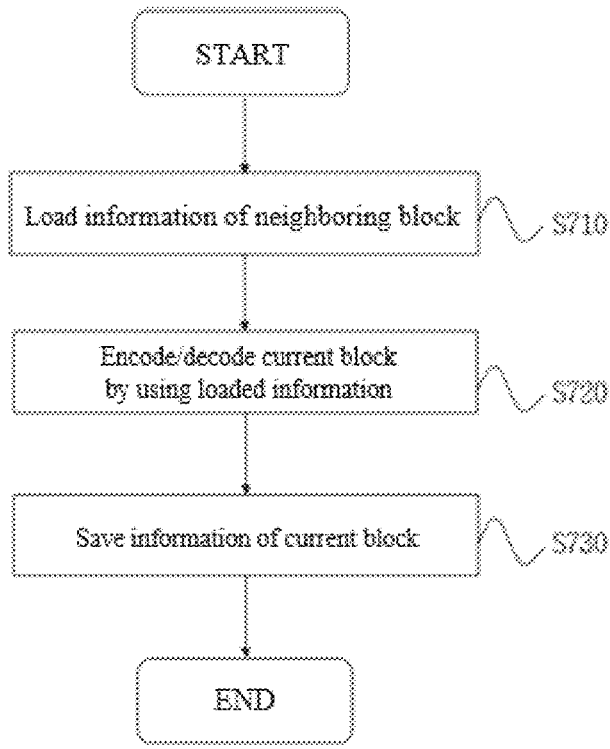
FIG. 7 is a diagram illustrating an encoding or decoding method according to the present invention.

An encoding/decoding method illustrated in FIG. 7 is executed by the encoding apparatus 100 or the decoding apparatus 200.

The encoding/decoding method according to one embodiment of the present invention includes loading information of a neighboring block of a current block (S710), encoding/decoding the current block using the loaded information (S720), and saving information of the current block generated by the encoding/decoding of the current block (S730).

In step S710, whether to or not to load information of a neighboring block is determined.

For example, when it is determined not to load information of one or more neighboring blocks, the encoding apparatus or the decoding apparatus does not load the information of the one or more neighboring blocks by determining the status of the neighboring block(s) as unavailable.

In another example, when it is determined not to load information of one or more neighboring blocks, the encoding apparatus or the decoding apparatus does not load the information the on the one or more neighboring blocks by setting information of one or more previously encoded/decoded blocks as the information of the one or more neighboring blocks.

In a further example, when it is determined not to load information of one or more neighboring blocks, the encoding apparatus or the decoding apparatus does not load the information of the one or more neighboring blocks by setting a fixed value predefined in the encoding apparatus and the decoding apparatus as the information of the one or more neighboring blocks.

On the other hand, when it is determined to load information of one or more neighboring blocks, the encoding apparatus or the decoding apparatus sets the neighboring block's information stored in a line buffer as the information of the one or more neighboring blocks of the current block.

In another example, when it is determined to load information of one or more neighboring blocks, the encoding apparatus or the decoding apparatus performs an inverse operation on the neighboring block's information stored in a line buffer and sets the resulting value of the inverse operation as the information of the one or more neighboring blocks of the current block.

In this case, whether to load or not to load information of a neighboring block of the current block is determined depending on the content of the information of the neighboring block.

For example, when information of a neighboring block is a luma-component intra prediction mode, the encoding apparatus or the decoding apparatus loads the information of the neighboring block. In another example, when information of a neighboring block is a coding block flag (CBF), the encoding apparatus or the decoding apparatus does not load the information of the neighboring block.

In this way, whether to or not to load information of a neighboring block is determined depending on the content of the information of the neighboring block.

In step S720, the current block is encoded/decoded with the loaded information. Specifically, one or more pieces of information of a neighboring block of the current block are used in at least one step during the encoding/decoding of the current block.

Here, the at least one step refers to one or more processes selected from among inter prediction, intra prediction, transform, inverse transform, quantization, dequantization, entropy encoding, entropy decoding, and in-loop filtering. Other various steps or processes that require block information can be referred to as the encoding/decoding process.

In step S730, information of the current block generated in the encoding/decoding process of the current block is saved. The reason why the information of the current block is saved is to use the information of the current block for encoding/decoding of the subsequent blocks.

When saving information of the current block, the encoding apparatus or the decoding apparatus saves at least one piece of the information of the current block in a line buffer. Alternatively, the encoding apparatus or the decoding apparatus performs a predetermined operation on at least one piece of the information of the current block and stores the result of the operation in the line buffer.

In this case, a process of determining whether to save the information of the current block is performed first. Whether to save the information of the current block is determined depending on the content of the information of the current block.

For example, when the content of the information of the current block is a luma intra prediction mode, the encoding apparatus or the decoding apparatus saves the information of the current block in the line buffer. On the other hand, when the content of the information of the current block is a coding block flag (CBF), the encoding apparatus or the decoding apparatus does not save the information of the current block in the line buffer.

Aside from these, whether to or not to load information of neighboring blocks may be determined according to one or more pieces of information generated by the encoding/decoding.

In the present invention, the line buffer is an entity that a video codec uses to save or load block information.

For example, in the present invention, the line buffer refers to a memory. Specifically, it refers to an on-chip memory or an external memory. Alternatively, in the present invention, a register, a random access memory (RAM), or the like also can be used as the line buffer.

In the present invention, the encoding apparatus or the decoding apparatus saves block information generated by inter prediction, intra prediction, transform, inverse transform, quantization, dequantization, entropy encoding, entropy decoding, or in-loop filtering, in the line buffer to use the stored block information for the encoding/decoding process of the subsequent blocks. The encoding apparatus or the decoding apparatus loads and uses one or more pieces of neighboring block's information stored in the line buffer, at the time of encoding/decoding the next block.

In the present invention, information of a block (hereinafter, referred to as block information) refers to at least one of the coding parameters enumerated above.

For example, the block information means information used in at least one of the processes selected from among inter prediction, intra prediction, transform, inverse transform, quantization, dequantization, entropy encoding, entropy decoding, and in-loop filtering. Specifically, the block information refers to any one of the following parameters or any combination of the following parameters: block size, block depth, block partition information, block form (square or non-square), whether quad-tree partition is performed, whether binary-tree partition is performed, direction of binary-tree partition (horizontal or vertical), binary-tree partition type (symmetric or asymmetric), whether ternary-tree partition is performed, direction of ternary-tree partition (horizontal or vertical), prediction mode (intra prediction or inter prediction), luma intra prediction mode/direction, chroma intra prediction mode/direction, intra prediction partition information, inter prediction partition information, coding block partition flag, prediction block partition flag, transform block partition flag, reference sample filter tap, reference sample filter coefficient, prediction block filter tap, prediction block filter coefficient, prediction block boundary filter tap, prediction block boundary filter coefficient, motion vector (motion vector for at least one of L0, L1, L2, L3, and the like), motion vector difference (motion vector difference for at least one of L0, L1, L2, L3, and the like), direction of inter prediction (unidirectional or bidirectional), reference picture index (reference picture index for at least one of L0, L1, L2, L3, and the like), inter prediction indicator, prediction list utilization information (whether used or not), reference picture list, motion vector prediction index, motion vector prediction candidate, motion vector candidate list, merge mode information (whether used or not), merge index, merge candidate, merge candidate list, skip mode information (whether used for not), interpolation filter type, interpolation filter tap, interpolation filter coefficient, motion vector size, motion vector precision (integer sample, ½ sample, ¼ sample, ⅛ sample, 1/16 sample, 1/32 sample, etc.), transform type, transform size, primary transform utilization information (whether used or not), secondary transform utilization information (whether used or not), primary transform index, secondary transform index, residual signal presence information (whether exists or not), coding block pattern, coding block flag, coding parameter, residual quantization parameter, quantization matrix, in-picture loop filter application information (whether applied or not), in-picture loop filter coefficient, in-picture loop filter tap, in-picture loop filter shape/form, deblocking filter application information (whether applied or not), deblocking filter coefficient, deblocking filter tab, deblocking filter strength, deblocking filter shape/form, adaptive sample offset (SAO) application information (whether applied or not), adaptive sample offset value, adaptive sample offset category, adaptive sample offset type, adaptive loop filter (ALF) application information (whether applied or not), adaptive loop filter coefficient, adaptive loop filter tab, adaptive loop filter shape/form, adaptive loop filter index, binarization/inverse binarization method, context model decision method, context model updating method, regular mode utilization information (whether used or not), bypass mode utilization flag, context bin, bypass bin, significant coefficient flag, last significant coefficient flag, coding flag per coefficient group, position of last significant flag, flag indicating whether coefficient value is greater than 1, flag indicating whether coefficient value is greater than 2, flag indicating whether coefficient value is greater than 3, remaining coefficient value information, sign information, reconstructed luma sample, reconstructed chroma sample, residual luma sample, residual chroma sample, luma transform coefficient, chroma transform coefficient, luma quantization level, chroma quantization level, transform coefficient level scanning method, size of decoder-side motion vector search area, shape of decoder-side motion vector search area, decoder-side motion vector search frequency, CTU size, minimum block size, maximum block size, maximum block depth, minimum block depth, slice identification information, slice partition information, tile identification information, tile type, tile partition information, bit depth of input sample, bit depth of reconstructed sample, bit depth of residual sample, bit depth of transform coefficient, and bit depth of quantization level.

A CTU is one section of a picture, which is included within a sub-picture, such as a slice, a tile, or a tile group, segmented from a picture. CTUs are encoded/decoded row by row and from left to right for each row, or column by column and from top to bottom for each column.

Each CTU includes one or more units for encoding/decoding, for example, one or more macroblocks, LCUs, CUs, or the like. Each CTU includes one or more coding units or coding blocks. That is, each CTU is a unit composed of one or more blocks or one or more units on each of which encoding/decoding is performed.

Figure 8:
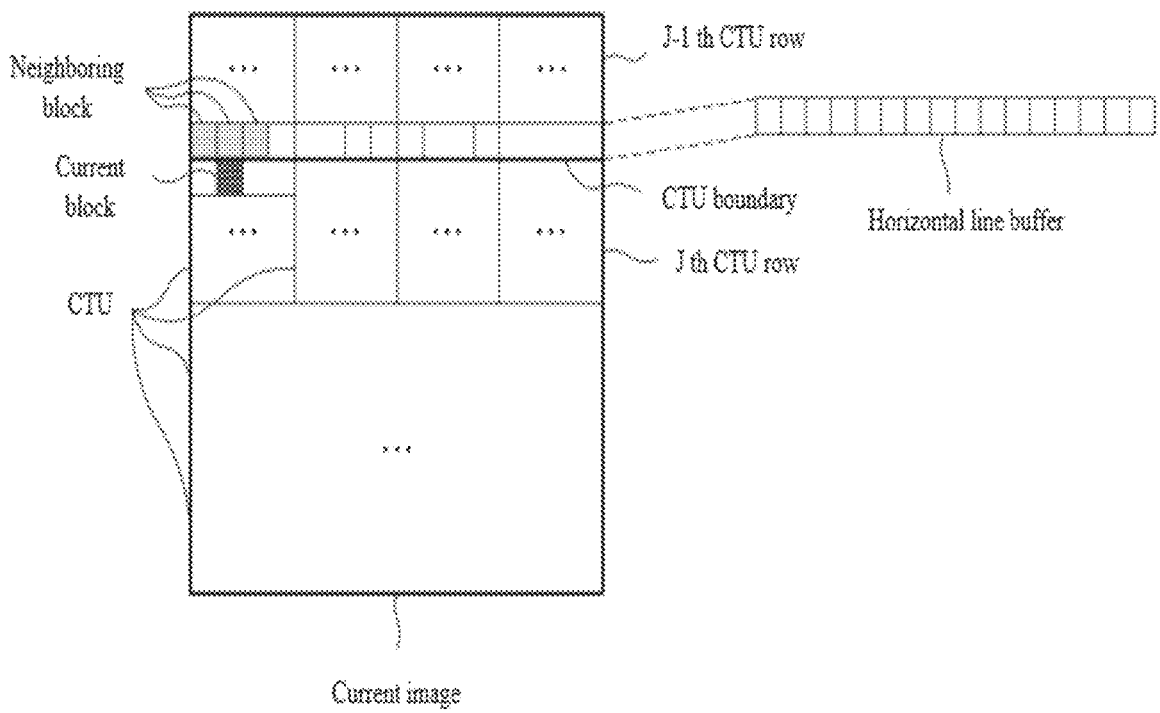
FIG. 8 is a diagram illustrating a horizontal line buffer.

FIG. 8 is a diagram illustrating a horizontal line buffer.

When encoding/decoding CTUs row by row, from left to right in each CTU row, and the current CTU is in the J-th row, information of blocks included in CTUs located in the (J−1)-th row is saved in the line buffer. When CTUs in each CTU row is encoded/decoded from left to right, the encoding/decoding order of the CTUs is referred to as raster scan order or horizontal scan order.

For example, when information of lowermost blocks in a predetermined CTU row is saved in the line buffer on a block-by-block basis, each of the uppermost blocks in the next CTU row uses the previously saved block information as the information of their upper neighboring blocks. The line buffer used in this case is referred to as a horizontal line buffer or a row buffer.

When an image is divided into slices, tiles, or tile groups, and a horizontal boundary exists, information of blocks located at the bottom of a slice, tile, or tile group located on the upper side of the current slice, tile, or tile group is saved in the horizontal line or the row buffer. The size of the horizontal line buffer or the row buffer is proportional to the horizontal size of a picture.

Figure 9:
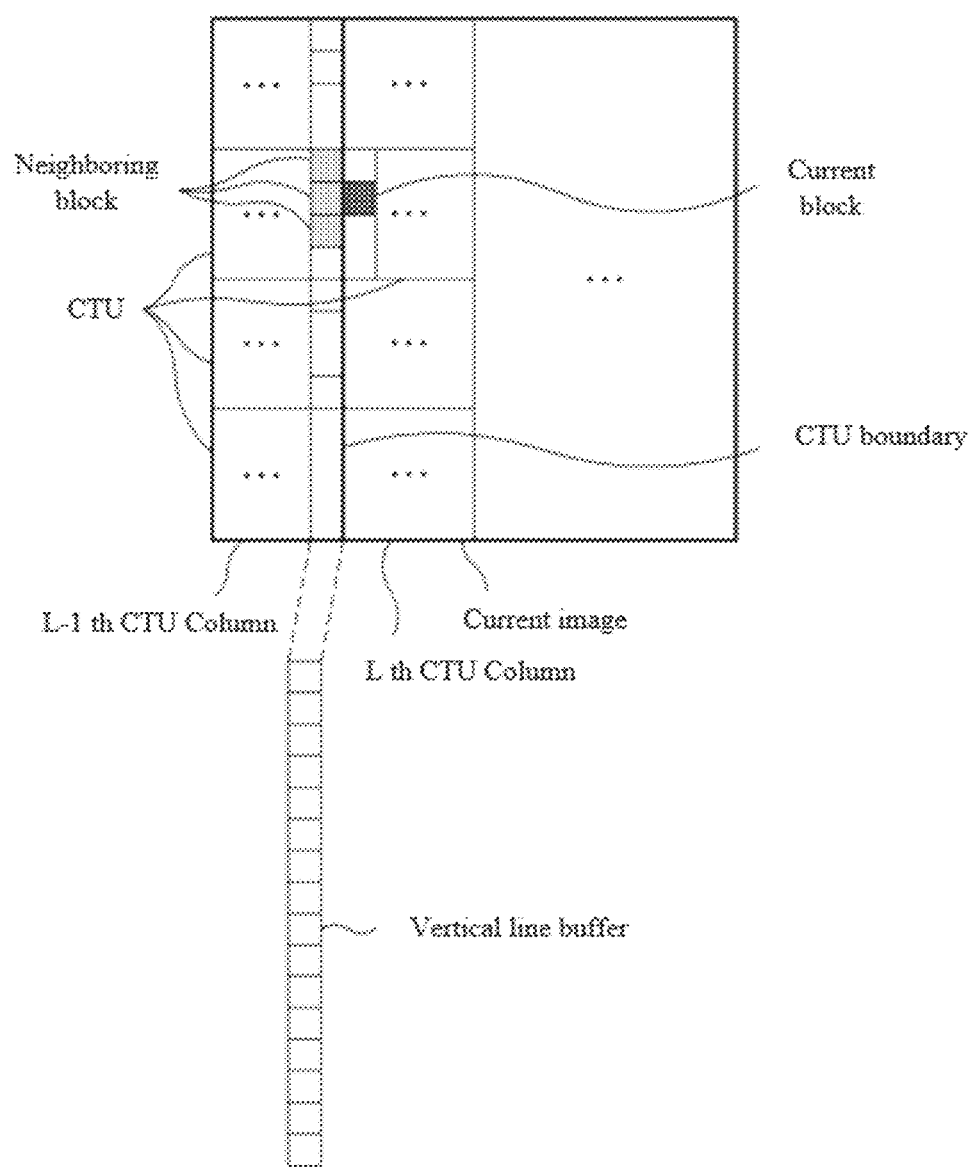
FIG. 9 is a diagram illustrating a vertical line buffer.

FIG. 9 is a diagram illustrating a vertical line buffer.

When encoding/decoding CTUs column by column, from top to bottom in each CTU column, and the current CTU is in the L-th column, information of blocks included in CTUs located in the (L−1)-th column is saved in the line buffer. When CTUs in each CTU column are encoded/decoded from top to bottom, the encoding/decoding order of the CTUs is referred to as vertical scan order.

For example, when information of the rightmost blocks in CTUs in a predetermined column is stored in the line buffer on a block-by-block basis, each of the leftmost blocks in CTUs in the next column uses the previously saved block information as the information of the left neighboring blocks. The line buffer used in this case is referred to as a vertical line buffer or a column buffer.

When an image (or picture) is divided into slices, tiles, or tile groups and a vertical boundary exists, information of the rightmost blocks in a slice, tile, or tile group on the left side of the current slice, tile, or tile group is saved in the vertical line buffer or the column buffer. The size of the vertical line buffer or the column buffer is proportional to the vertical size of the image (or picture).

In the following description, the line buffer means at least one of a horizontal line buffer, a row buffer, a vertical line buffer, and a column buffer.

Figure 10:
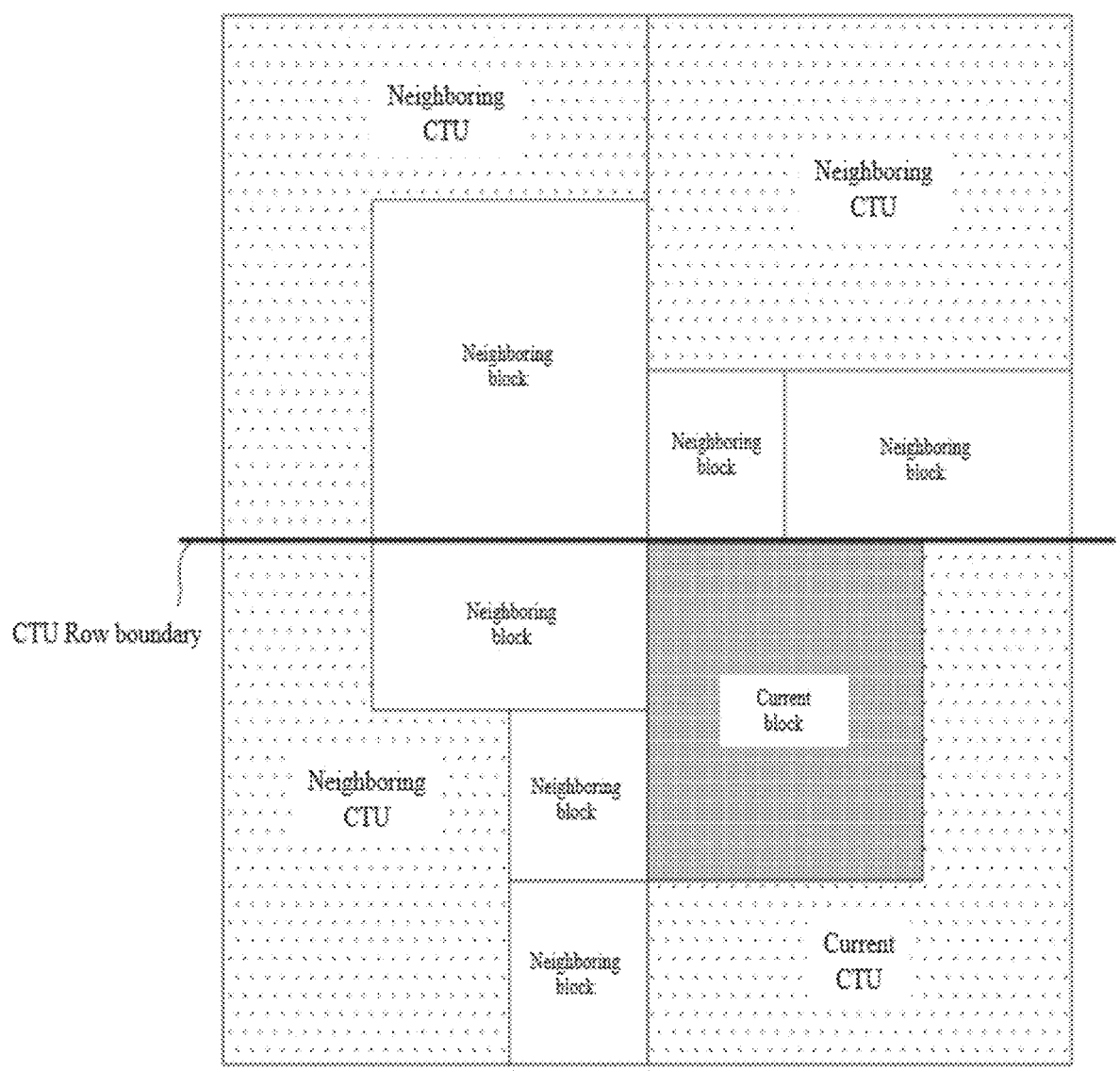
FIG. 10 is a diagram illustrating a method in which information of a neighboring block is referred to for processing of a current block located at a boundary of a CTU row.
Figure 11:
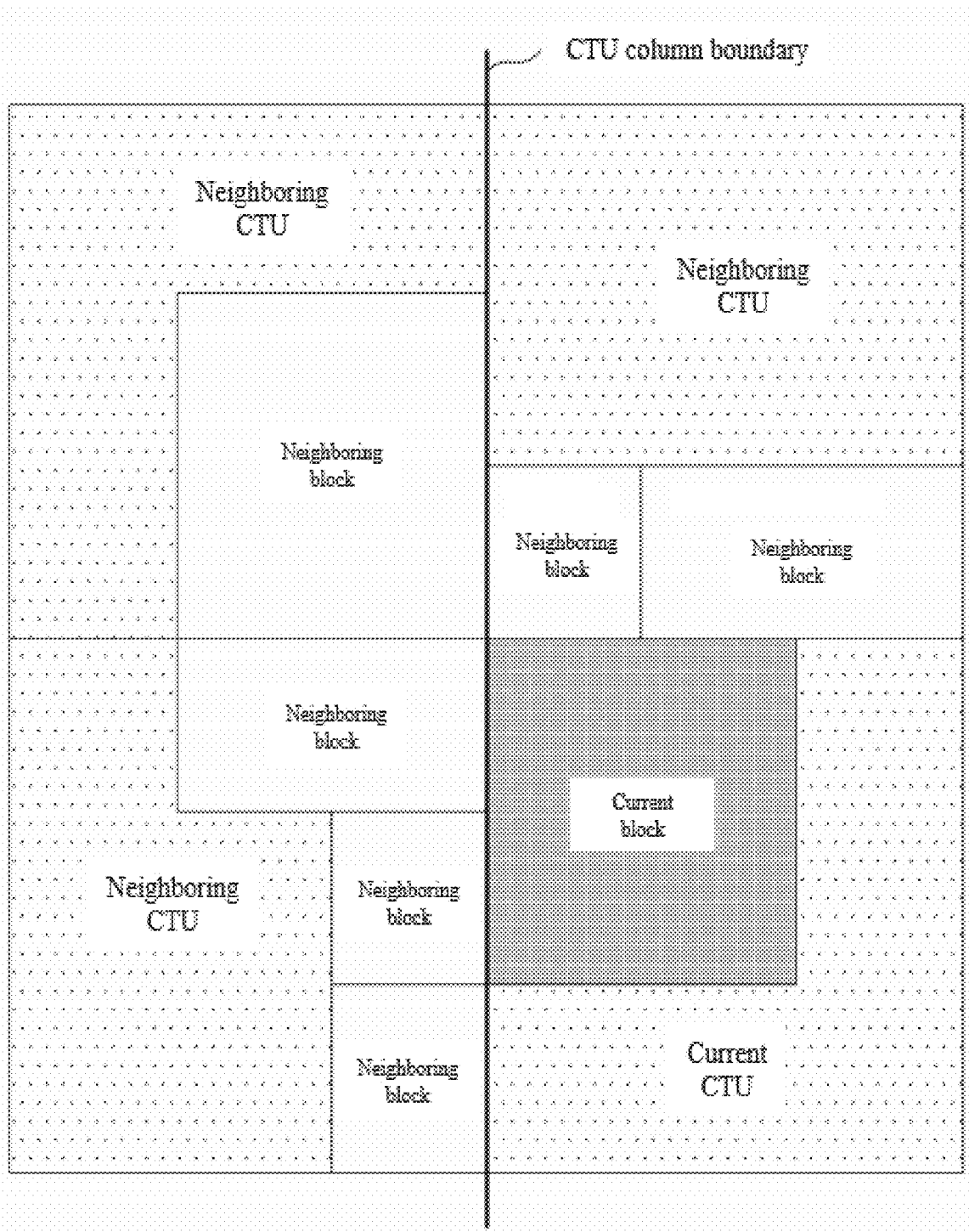
FIG. 11 is a diagram illustrating a method in which information of a neighboring block is referred to for processing of a current block located at a boundary of a CTU column.

FIG. 10 is a diagram illustrating a method in which information of a neighboring block is used for processing of a current block located at a boundary of a CTU row, and FIG. 11 is a diagram illustrating a method in which information of a neighboring block is used for processing of a current block located at a boundary of a CTU column.

The neighboring blocks used in the present invention will be described with reference to FIGS. 10 and 11.

In the present invention, the term "neighboring block" means at least one of the blocks spatially adjacent to the current block. That is, the neighboring block is one of the following blocks: an upper neighboring block adjacent to the upper boundary of the current block, an upper left neighboring block adjacent to the upper left corner of the current block, an upper right neighboring block adjacent to the upper right corner of the current block, a left neighboring block adjacent to the left boundary of the current block, and a lower left neighboring block adjacent to the lower left corner of the current block.

For example, the upper neighboring block is a block that is adjacent to the current block, is present outside a row boundary of a CTU, and is present near the upper boundary of the CTU. For example, the upper left neighboring block is a block that is adjacent to the current block, is present outside a row boundary of a CTU, and is present near the upper left corner of the CTU. For example, the upper right neighboring block is a block that is adjacent to the current block, is present outside a row boundary of a CTU, and is present near the upper right corner of the CTU.

For example, the left neighboring block is a block that is adjacent to the current block, is present outside a column boundary of a CTU, and is present on the left side of the CTU. For example, the lower left neighboring block is a block that is adjacent to the current block, is present outside a column boundary of a CTU, and is present near the lower left corner of the CTU.

In addition, the neighboring block may be at least one of the spatial neighboring blocks adjacent to the boundaries of the current block. The neighboring block refers to a block located outside the row or column boundaries of a CTU to which the current block belongs, and specifically refers to one of spatial neighboring blocks adjacent to the boundaries of the current block.

The neighboring block refers to at least one of the spatial neighboring blocks including one or more samples that are located outside the current block and which are adjacent to a specific sample position within the current block. The neighboring block refers to a block that is present outside the row or column boundaries of a CTU to which the current block belongs and refers to one of the spatial neighboring blocks including one or more samples that are located outside the current block and which are adjacent to a specific sample position within the current block.

The neighboring block refers to one of the temporal neighboring blocks that belong to pictures, slices, tiles, or tile groups other than a picture, slice, tile, or tile group to which the current block belongs. Each temporal neighboring block is a collocated block corresponding to the spatial position of the current block or a block adjacent to the collocated block, among the blocks belonging to a reference picture, a reference slice, a reference tile, or a reference tile group.

That is, the neighboring block in the present invention means one of the spatial or temporal neighboring blocks of the current block.

In the following description of the present invention, a case where a neighboring block of the current block is present at a row or column boundary of a CTU will be described. However, the scope of the present invention is not limited thereto. That is, the present invention covers various cases. For example, a neighboring block of the current block is present at a slice boundary, a tile boundary, or a tile group boundary.

The line buffer is required to store or load information of a block existing outside a boundary of a CTU to which the current block belongs. Alternatively, when saving or loading information of each block existing within a CTU to which the current block belongs, an additional CTU-based or block-based memory is used.

When a CTU is encoded/decoded in raster scan order, the line buffer for saving or loading the information of a block existing on the left side of the current block is relatively small. Thus, it can be easily implemented as an on-chip memory and it does not increase the external memory access bandwidth.

On the other hand, the size of the line buffer for saving or loading the information of a block existing within a CTU located on the upper side of the current CTU to which the current block belongs increases with the horizontal size of an image. That is, when an on-chip line buffer is used to save information of a block existing within a CTU located on the upper side of the current CTU, there is a problem that the chip area and cost increase significantly. On the other hand, when an external memory is used to save information of a block existing within a CTU located on the upper side of the current block, there is a problem that the external memory access bandwidth significantly increases.

In spite of these problems, since the block information includes various kinds of information and is large in data amount, the size of the line buffer increases with the size of an image. That is, there is a problem that the complexity and cost for hardware resources and memory bandwidths required to implement a video codec increase due to the increased size of the line buffer.

Hereinafter, embodiments of the present invention capable of solving the above-described problems will be described in detail.

FIGS. 12 to 18 are diagrams illustrating methods in which information of a neighboring block is used for processing of a current block located at a boundary of a CTU row, according to various embodiments of the present invention.

In order to eliminate a line buffer in which information of neighboring blocks is to be stored, when a neighboring block is present outside a row or column boundary of a current CTU, the encoding apparatus or the decoding apparatus encodes/decodes the current block by using one of the methods described below or by using any combination of the methods.

Here, the line buffer elimination means that a line buffer for storing at least one piece of block information is not used. That is, the encoding apparatus or the decoding apparatus does not save at least one piece of block information in a line buffer, does not use at least one piece of block information when encoding/decoding the current block, or uses a predetermined value when encoding/decoding the current block by replacing stored block information with the predetermined value.

Figure 12:
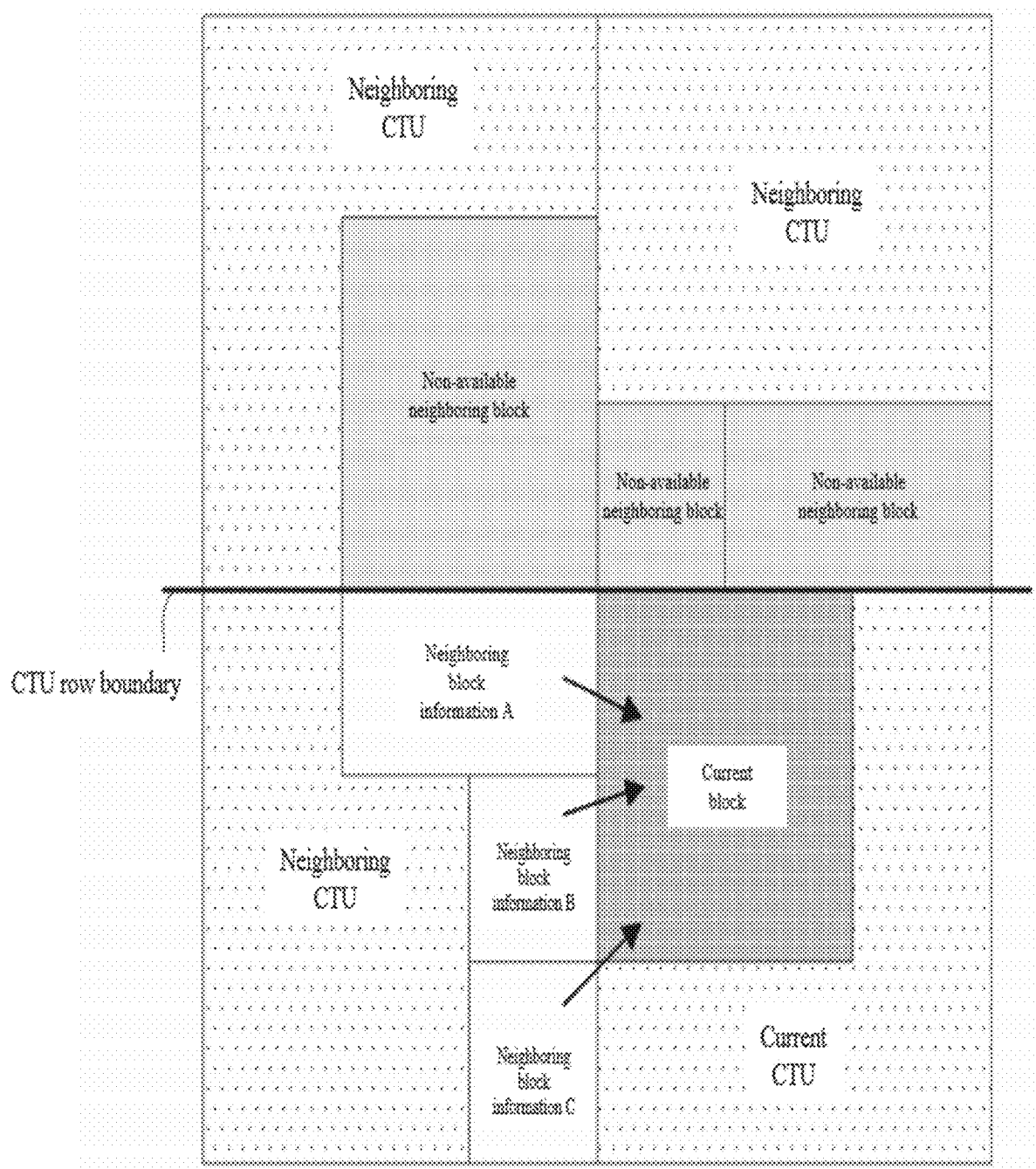
FIGS. 12 to 18 are diagrams illustrating methods in which information of a neighboring block is referred to for processing of a current block located at a boundary of a CTU row, according various embodiments of the present invention.

FIG. 12 is a diagram illustrating a method in which information of a neighboring block is used for processing a current block located at a boundary of a CTU row, according to one embodiment of the present invention.

As illustrated in FIG. 12, when a neighboring block is present outside a row or column boundary of the current CTU, the encoding apparatus or the decoding apparatus determines that the status of the neighboring block as unavailable and does not use at least one piece of the information of the neighboring block for encoding/decoding of the current block.

Arrows in FIG. 12 indicate that information of one or more neighboring blocks with the arrows thereon is used for encoding/decoding of the current block. Neighboring blocks with no arrows thereon mean that information of the neighboring blocks is not used for encoding/decoding of the current block.

For example, when a neighboring block is present outside a row or column boundary of the current CTU, the encoding apparatus or the decoding apparatus determines the neighboring block as a non-available block and does not use the motion vector or motion vector difference of the neighboring block for inter prediction of the current block.

In another example, when a neighboring block is present outside a row or column boundary of the current CTU, the encoding apparatus or the decoding apparatus determines the neighboring block as a non-available block and does not use the luma intra prediction mode or the chroma intra prediction mode of the neighboring block for intra prediction of the current block.

In a further example, when a neighboring block is present outside a row or column boundary of the current CTU, the encoding apparatus or the decoding apparatus determines the neighboring block as a non-available block and does not use the reconstructed luma samples, the reconstructed chroma samples, the residual luma samples, or the residual chroma samples of the neighboring block for intra prediction of the current block.

In a yet further example, when a neighboring block is present outside a row or column boundary of the current CTU, the encoding apparatus or the decoding apparatus determines the neighboring block as a non-available block and does not use information of whether primary transform is used, information of whether secondary transform is used, primary transform index, or secondary transform index of the neighboring block for transform or inverse transform of the current block.

In a yet further example, when a neighboring block is present outside a row or column boundary of the current CTU, the encoding apparatus or the decoding apparatus determines the neighboring block as a non-available block and does not use the luma transform coefficient or the chroma transform coefficient of the neighboring block for transform or inverse transform of the current block.

In a yet further example, when a neighboring block is present outside a row or column boundary of the current CTU, the encoding apparatus or the decoding apparatus determines the neighboring block as a non-available block and does not use the quantization parameter or the residual quantization parameter of the neighboring block for quantization or dequantization of the current block.

In a yet further example, when a neighboring block is present outside a row or column boundary of the current CTU, the encoding apparatus or the decoding apparatus determines the neighboring block as a non-available block and does not use the luma quantization level or the chroma quantization level of the neighboring block for quantization or dequantization of the current block.

In a yet further example, when a neighboring block is present outside a row or column boundary of the current CTU, the encoding apparatus or the decoding apparatus determines the neighboring block as a non-available block and does not use the block partition information of the neighboring block (i.e., whether a quad-tree partition is performed, whether a binary-tree partition is performed, or whether a ternary-tree partition is performed) for entropy-encoding/decoding of the current block.

In a yet further example, when a neighboring block is present outside a row or column boundary of the current CTU, the encoding apparatus or the decoding apparatus determines the neighboring block as a non-available block and does not use the significant coefficient flag of the neighboring block for entropy-encoding/decoding of the current block.

In a yet further example, when a neighboring block is present outside a row or column boundary of the current CTU, the encoding apparatus or the decoding apparatus determines the neighboring block as a non-available block and does not use the transform coefficient scanning method of the neighboring block for entropy-encoding/decoding of the current block.

In a yet further example, when a neighboring block is present outside a row or column boundary of the current CTU, the encoding apparatus or the decoding apparatus determines the neighboring block as a non-available block and the coding apparatus determines the neighboring block as a non-available block and does not use the deblocking filter coefficient, the deblocking filter tap, or the deblocking filter strength of the neighboring block for in-loop filtering of the current block.

In a yet further example, when a neighboring block is present outside a row or column boundary of the current CTU, the encoding apparatus or the decoding apparatus determines the neighboring block as a non-available block and does not use information of whether an adaptive sample offset is applied to the neighboring block, the adaptive sample offset value, the adaptive sample offset category, or the adaptive sample offset class of the neighboring block for in-loop filtering of the current block.

In a further example, when a neighboring block is present outside a row or column boundary of the current CTU, the encoding apparatus or the decoding apparatus determines the neighboring block as a non-available block and does not use information of whether an adaptive loop filter is applied to the neighboring block, the adaptive loop filter coefficient, the adaptive loop filter tap, the adaptive loop filter shape/form, and the adaptive loop filter index of the neighboring block for in-loop filtering of the current block.

In the embodiments described above, when the current block is adjacent to a boundary of a CTU, a slice, a tile, or a tile group, at least one piece of the information of the current block is not saved in the line buffer.

Figure 13:
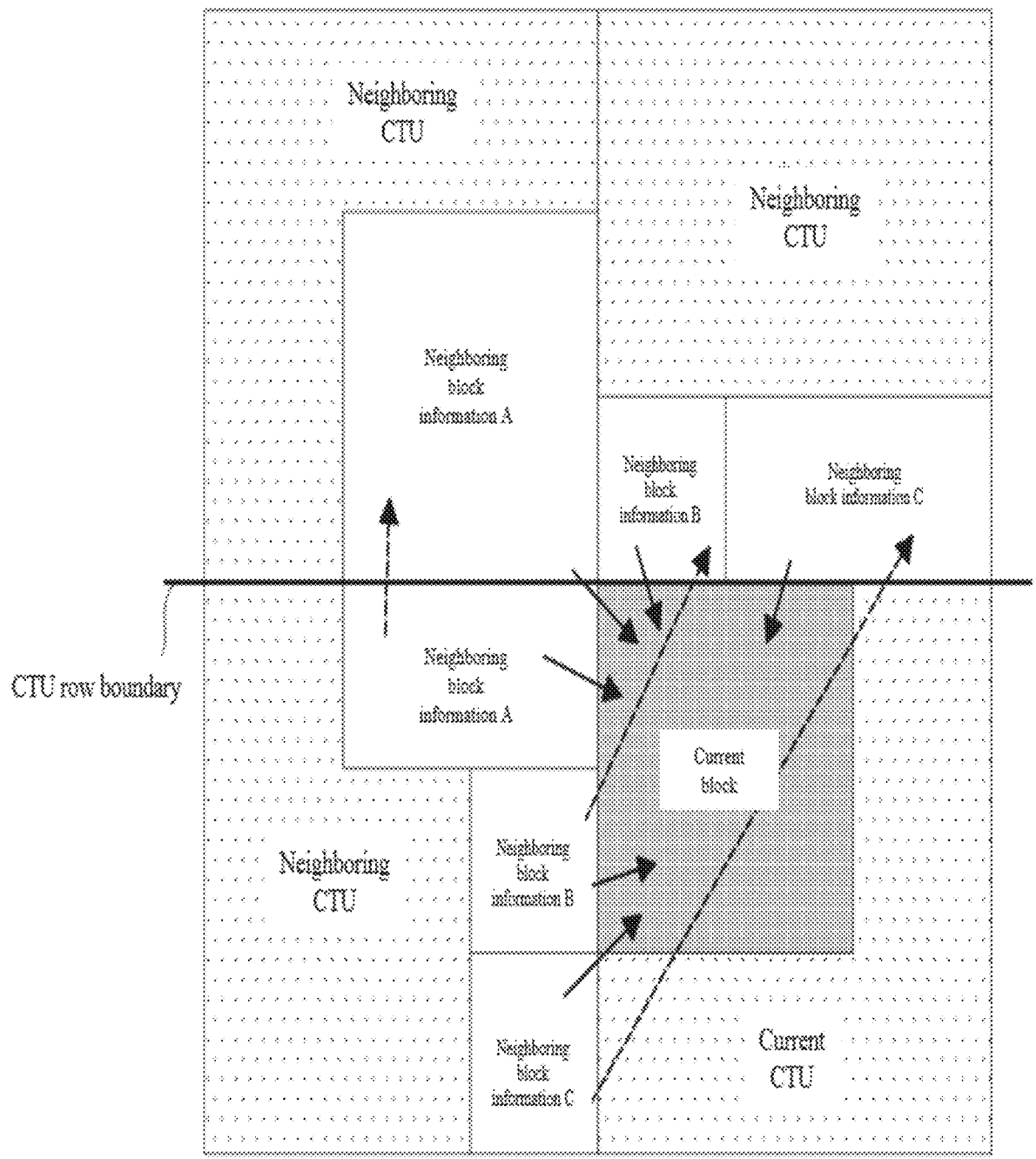

FIG. 13 is a diagram illustrating methods in which information of a neighboring block is used for processing of a current block located at a boundary of a CTU row, according to various embodiments of the present invention.

As illustrated in FIG. 13, when a neighboring block is present outside a row or column boundary of the current CTU, the encoding apparatus or the decoding apparatus replaces information of the neighboring block located outside the current CTU with information of a previously encoded/decoded block prior to the current block or information of a neighboring block located within the current CTU.

Solid arrows in FIG. 13 mean that information of one or more neighboring blocks is used for processing of the current block. On the other hand, dotted arrows in FIG. 13 mean that information of one or more neighboring blocks existing outside a row or column boundary of the current CTU is replaced with information of at least one previously encoded/decoded block or information of at least one neighboring block within the current CTU.

The start and end points of each dotted arrow in FIG. 13 are illustrative, and such illustration does not limit the scope of the present invention. For example, information A on a neighboring block existing within the current CTU row is used to replace not only information of an upper left neighboring block but also information of an upper right neighboring block of the current block. That is, correspondences among neighboring blocks indicated by the arrows are only illustrative and do not limit the scope of the present invention.

For example, when a neighboring block is present outside a row or column boundary of the current CTU, the encoding apparatus or the decoding apparatus sets the motion vector prediction index or the merge index of a previously encoded/decoded block or a neighboring block within the current CTU as the motion vector prediction index or the merge index of the neighboring block located outside the row or column boundary of the current CTU, and uses the set information for inter prediction of the current block.

In another example, when a neighboring block is present outside a row or column boundary of the current CTU, the encoding apparatus or the decoding apparatus sets the interpolated filter coefficients of a previously encoded/decoded block or a neighboring blocks within the current CTU as the interpolation filter coefficients of the neighboring block located outside the row or column boundary of the current CTU, and uses the set information for inter prediction of the current block.

In a further example, when a neighboring block is present outside a row or column boundary of the current CTU, the encoding apparatus or the decoding apparatus sets the motion vector precision of a previously encoded/decoded block or a neighboring block within the current CTU as the motion vector precision of the neighboring block located outside the row or column boundary of the current block and uses the set information for inter prediction of the current block.

In a yet further example, when a neighboring block is present outside a row or column boundary of the current CTU, the encoding apparatus or the decoding apparatus sets the luma intra prediction mode or the chroma intra prediction mode of a previously encoded/decoded block or a neighboring block within the current CTU as the luma intra prediction mode or the chroma intra prediction mode of the neighboring block located outside the row or column boundary of the current CTU and uses the set information for intra prediction of the current block.

In a yet further example, when a neighboring block is present outside a row or column boundary of the current CTU, the encoding apparatus or the decoding apparatus sets the reconstructed luma samples, the reconstructed chroma samples, the residual luma samples, or the residual chroma samples within a previously encoded/decoded block or a neighboring block within the current CTU, as the reconstructed luma samples, the reconstructed chroma samples, the residual luma samples, or the residual chroma samples of the neighboring block located outside the row or column boundary of the current CTU, and uses the set information for intra prediction of the current block.

In a yet further example, when a neighboring block is present outside a row or column boundary of the current CTU, the encoding apparatus or the decoding apparatus sets the primary transform utilization information (whether used or not), secondary transform utilization information (whether used or not), primary transform index, or secondary transform index of a previously encoded/decoded block or a neighboring block within the current CTU, as the primary transform utilization information (whether used or not), the secondary transform utilization information (whether used or not), the primary transform index, or the secondary transform index of the neighboring block located outside the row or column boundary of the current CTU, and uses the net information for transform or inverse transform of the current block.

In a yet further example, when a neighboring block is present outside a row or column boundary of the current CTU, the encoding apparatus or the decoding apparatus sets the luma or chroma transform coefficients of a previously encoded/decoded block or a neighboring block within the current CTU as the luma or chroma transform coefficients of the neighboring block located outside the row or column boundary of the current CTU, and uses the set information for transform or inverse transform of the current block.

In a yet further example, when a neighboring block is present outside a row or column boundary of the current CTU, the encoding or decoding apparatus sets the quantization parameter or the residual quantization parameter of a previously encoded/decoded block or a neighboring block within the current CTU as the quantization parameter or the residual quantization parameter of the neighboring block located outside the row or column boundary of the current block and uses the set information for quantization or dequantization of the current block.

In a yet further example, when a neighboring block is present outside a row or column boundary of the current CTU, the encoding apparatus or the decoding apparatus sets the luma intra prediction mode or the chroma intra prediction mode of a previously encoded/decoded block or a neighboring block within the current CTU as the luma intra prediction mode or the chroma intra prediction mode of the neighboring block located outside the row or column boundary of the current CTU and uses the set information for quantization or dequantization of the current block.

In a yet further example, when a neighboring block is present outside a row or column boundary of the current CTU, the encoding or decoding apparatus sets the block type, the direction (horizontal direction or vertical direction) of binary-tree partition, or the type (symmetric division or asymmetric partition) of binary-tree partition of a previously encoded/decoded block or a neighboring block within the current CTU as the block type, the direction of binary-tree partition, or the type of binary-tree partition of the neighboring block located outside the row or column boundary of the current CTU, and uses the set information for encoding/decoding the current block.

Further alternatively, when a neighboring block is present outside a row or column boundary of the current CTU, the encoding or decoding apparatus sets the transform coefficient level scanning method of a previously encoded/decoded block or a neighboring block within the current CTU as the transform coefficient level scanning method of the neighboring block located outside the row or column boundary of the current CTU and uses the set information for entropy encoding/decoding of the current block.

Further alternatively, when a neighboring block is present outside a row or column boundary of the current CTU, the encoding or decoding apparatus sets the deblocking filter coefficient, the deblocking filter tap, or the deblocking filter strength of a previously encoded/decoded block or a neighboring block within the current CTU as the deblocking filter coefficient, the deblocking filter tap, or the deblocking filter strength of the neighboring block located outside the row or column boundary of the current CTU and uses the set information for in-loop filtering of the current block.

In a yet further example, when a neighboring block is present outside a row or column boundary of the current CTU, the encoding apparatus or the decoding apparatus sets the adaptive sample offset application information (whether applied or not), adaptive sample offset value, the adaptive sample offset category, or the adaptive sample offset type of a previously encoded/decoded block or a neighboring block within the current CTU as the adaptive sample offset application information (whether applied or not), the adaptive sample offset value, the adaptive sample offset category, or the adaptive sample offset type of the neighboring block located outside the row or column boundary of the current CTU and uses the set information for in-loop filtering of the current block.

In a yet further example, when a neighboring block is present outside a row or column boundary of the current CTU, the encoding apparatus or the decoding apparatus sets the adaptive loop filter application information (whether applied or not), the adaptive loop filter coefficient, the adaptive loop filter tap, the adaptive loop filter shape/type, or the adaptive loop filter index of a previously encoded/decoded block or a neighboring block within the current CTU as the adaptive loop filter application information (whether applied or not), the adaptive loop filter coefficient, the adaptive loop filter tap, the adaptive loop filter shape/type, or the adaptive loop filter index of the neighboring block located outside the current CTU and uses the set information for loop-filtering of the current block.

In the embodiments described above, when the current block is adjacent to a boundary of a CTU, a slice, a tile, or a tile group, at least one piece of the information of the current block is not saved in the line buffer.

Figure 14:
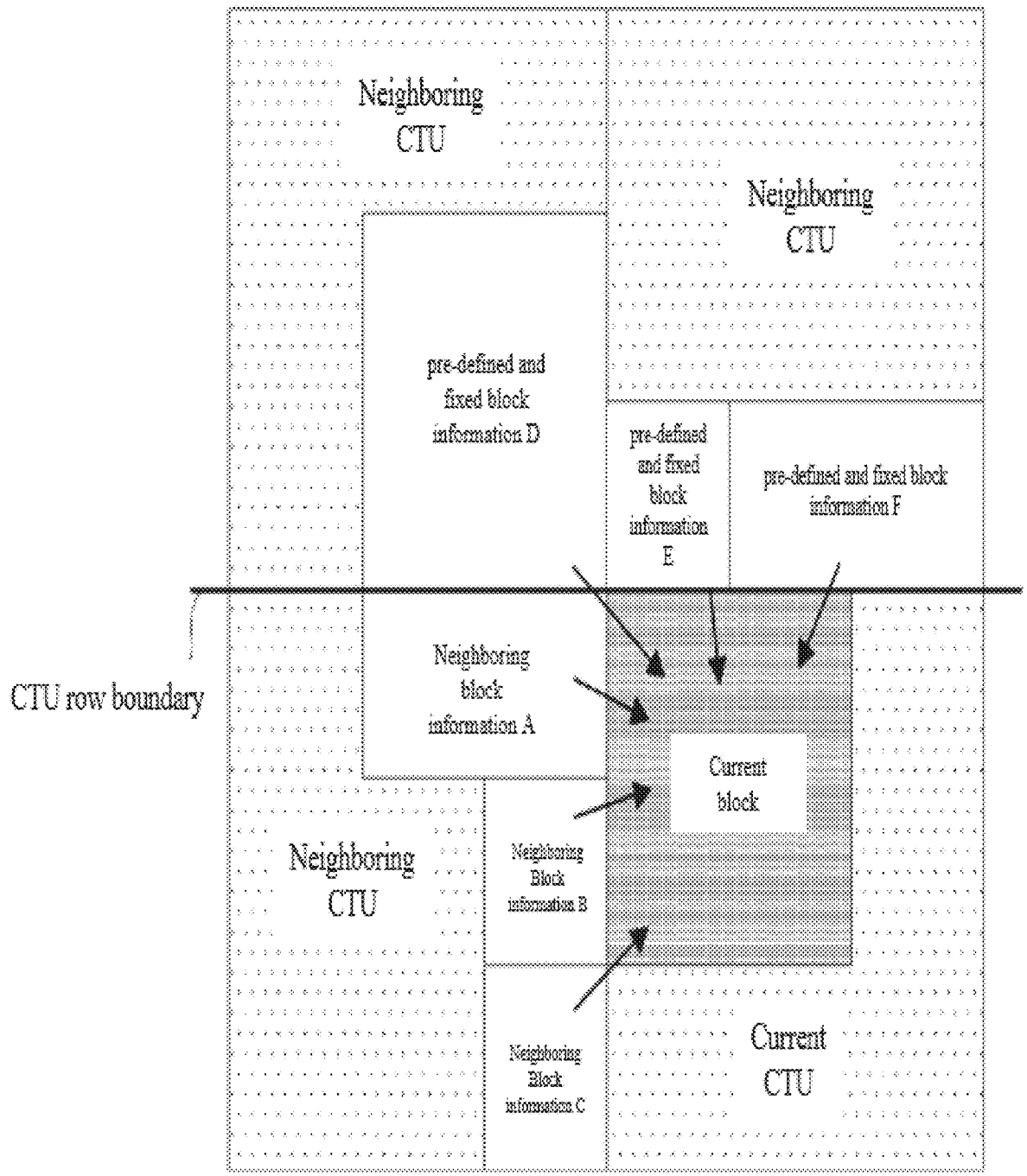

FIG. 14 is a diagram illustrating methods in which information of a neighboring block is used for processing of a current block located at a boundary of a CTU row, according to various embodiments of the present invention.

As illustrated in FIG. 14, when a neighboring block is present outside a row or column boundary of the current CTU, the encoding apparatus or the decoding apparatus sets a fixed value predefined in the encoding apparatus and the decoding apparatus as the information of at least one of the neighboring blocks adjacent to the current block.

Solid arrows in FIG. 14 mean that information of one or more neighboring blocks is used for processing of the current block.

For example, when a neighboring block is present outside a row or column boundary of the current CTU, the encoding apparatus or the decoding apparatus sets a fixed value (for example, (0, 0)) predefined in the encoding apparatus and the decoding apparatus, as the motion vector of the neighboring block and uses the set information for inter prediction of the current block.

In another example, when a neighboring block is present outside a row or column boundary of the current CTU, the encoding apparatus or the decoding apparatus sets a fixed value (for example, (0, 0)) predefined in the encoding apparatus and the decoding apparatus as the motion vector difference of the neighboring block and uses the set information for inter prediction of the current block.

Further alternatively, when a neighboring block is present outside a row or column boundary of the current CTU, the encoding apparatus or the decoding apparatus sets a fixed value (for example, 0) predefined in the encoding apparatus and the decoding apparatus as the reference picture index of the neighboring block and uses the set information for inter prediction of the current block.

In a yet further example, when a neighboring block is present outside a row or column boundary of the current CTU, the encoding apparatus or the decoding apparatus sets a fixed value (for example, bidirectional prediction) pre-defined in the encoding apparatus and the decoding apparatus as the inter prediction indicator of the neighboring block and uses the set information for inter prediction of the current block.

In a yet further example, when a neighboring block is present outside a row or column boundary of the current CTU, the encoding apparatus or the decoding apparatus sets a fixed value indicating DC mode or PLANAR mode as the luma intra prediction mode or the chroma intra prediction mode of the neighboring block and uses the set information for intra prediction of the current block.

Further alternatively, when a neighboring block is present outside a row or column boundary of the current CTU, the encoding apparatus or the decoding apparatus sets a fixed value (for example, $2<<(BitDepth-1)$) pre-defined in the encoding apparatus and the decoding apparatus as the reconstructed luma sample or the reconstructed chroma sample of the neighboring block and uses the set information for intra prediction of the current block. Here, the term "BitDepth" means the bit depth of an input signal and it is represented by a positive integer.

In a yet further example, when a neighboring block is present outside a row or column boundary of the current CTU, the encoding apparatus or the decoding apparatus sets a fixed value (for example, 0) predefined in the encoding apparatus and the decoding apparatus as the residual luma sample or the residual chroma sample of the neighboring block and uses the set information for intra prediction of the current block.

In a yet further example, when a neighboring block is present outside a row or column boundary of the current CTU, the encoding apparatus or the decoding apparatus sets a fixed value (for example, 0) predefined in the encoding apparatus and the decoding apparatus as the coding block flag of the neighboring block and uses the set information for transform or inverse transform of the current block.

Further alternatively, when a neighboring block is present outside a row or column boundary of the current CTU, the encoding apparatus or the decoding apparatus sets a fixed value (for example, 0) predefined in the encoding apparatus and the decoding apparatus as the coding block flag of the neighboring block to and uses the set information for quantization or dequantization of the current block.

In a yet further example, when the neighboring block is present outside a row or column boundary of the current CTU, the encoding apparatus or the decoding apparatus sets a fixed value (for example, 0) predefined in the encoding apparatus and the decoding apparatus as the residual quantization parameter of the neighboring block and uses the set information for quantization or dequantization of the current block.

In a yet further example, when a neighboring block is present outside a row or column boundary of the current CTU, the encoding apparatus or the decoding apparatus sets a fixed value (for example, square) predefined in the encoding apparatus and the decoding apparatus as the block type of the neighboring block and uses the set information for entropy-encoding/decoding of the current block.

In a yet further example, when a neighboring block is present outside a row or column boundary of the current CTU, the encoding apparatus or the decoding apparatus sets a fixed value (for example, a value indicating a filter strength at which deblocking filter is not performed) predefined in the encoding apparatus and the decoding apparatus as the deblocking filter strength of the neighboring block and uses the set information for in-loop filtering of the current block.

In a yet further example, when a neighboring block is present outside a row or column boundary of the current CTU, the encoding apparatus or the decoding apparatus sets a fixed value (for example, a value indicating an operation in which an adaptive sample offset is not applied) predefined in the encoding apparatus and the decoding apparatus as the adaptive sample offset application information of the neighboring block and uses the sets information for in-loop filtering of the current block.

In a yet further example, when a neighboring block is present outside a row or column boundary of the current CTU, the encoding apparatus or the decoding apparatus sets a fixed value (for example, a value indicating an operation in which an adaptive loop filter is not applied) predefined in the encoding apparatus and the decoding apparatus as the adaptive loop filter application information of the neighboring block and uses the set information for in-loop filtering of the current block.

In the embodiments described above, when the current block is adjacent to a boundary of a CTU, a slice, a tile, or a tile group, at least one piece of the information of the current block is not saved in the line buffer.

In order to reduce the size of the line buffer that stores information of neighboring blocks, when a neighboring block is present outside a row or column boundary of the current CTU, the encoding apparatus or the decoding apparatus encodes/decodes the current block by using one or more methods or a combination of one or more methods selected from among the methods described below.

Here, the reduction of the size of the line buffer means that at least one piece of the block information is stored in a line buffer having a reduced size as compared with a conventional line buffer required to store block information in a conventional method. That is, the encoding apparatus or the decoding apparatus compresses and saves at least one piece of the block information of a neighboring block in a line buffer, and then uses the compressed block information stored in the line buffer for processing of a current block or uses the block information after decompressing it, in which the block information means information of a neighboring block.

Figure 15:
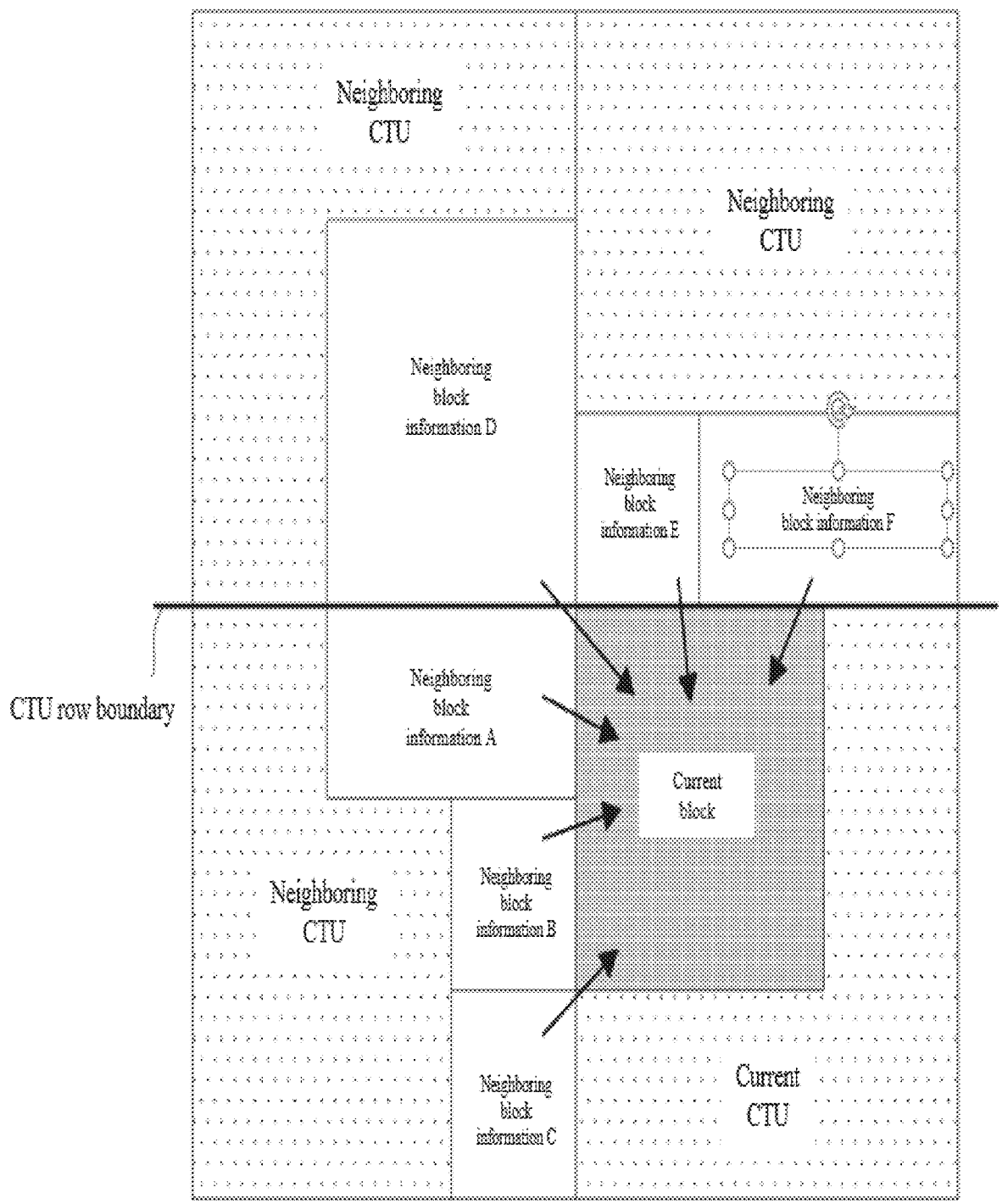

FIG. 15 is a diagram illustrating methods in which information of a neighboring block is used for processing of a current block, according to various embodiments of the present invention.

As illustrated in FIG. 15, at least one piece of the neighboring block's information stored in the line buffer is set as information of a neighboring block to be used for processing of the current block. The encoding apparatus or the decoding apparatus saves at least one piece of the information of the current block in the line buffer.

The information of the current block is information of the encoded/decoded current block. Solid arrows in FIG. 15 mean that information of one or more neighboring blocks is used for processing of the current block.

In the examples described below, the neighboring block may be present within or outside a row or column boundary of the current CTU.

For example, the encoding apparatus or the decoding apparatus sets a neighboring block's motion vector or a neighboring block's motion vector difference stored in the line buffer as the motion vector or the motion vector difference of a neighboring block of the current block and uses the set information for inter prediction of the current block.

In another example, the encoding apparatus or the decoding apparatus sets a neighboring block's reference picture index stored in the line buffer as the reference picture index of a neighboring block of the current block and uses the set information for inter prediction of the current block.

In a further example, the encoding apparatus or the decoding apparatus sets a neighboring block's inter prediction indicator stored in the line buffer as the inter prediction indicator of a neighboring block of the current block and uses the set information for inter prediction of the current block.

In a yet further example, the encoding apparatus or the decoding apparatus sets a neighboring block's motion vector prediction index or a neighboring block merge index stored in the line buffer as the motion vector prediction index or the merge index of a neighboring block of the current block and uses the set information for inter prediction of the current block.

In a yet further example, the encoding apparatus or the decoding apparatus sets a neighboring block's interpolation filter coefficient stored in the line buffer as the interpolation filter coefficient of a neighboring block of the current block and uses the set information for inter prediction of the current block.

In a yet further example, the encoding apparatus or the decoding apparatus sets a neighboring block's motion vector precision stored in the line buffer as the motion vector precision of a neighboring block of the current block and uses the set information for inter prediction of the current block.

In a yet further example, the encoding apparatus or the decoding apparatus sets a luma intra prediction mode or a neighboring block's chroma intra prediction mode stored in the line buffer as the luma intra prediction mode or the chroma intra prediction mode of a neighboring block of the current block and uses the set information for intra prediction of the current block.

In a yet further example, the encoding apparatus or the decoding apparatus sets a neighboring block's reference sample filter application information (whether applied or not), a neighboring block's prediction block filter application information (whether applied or not), or a neighboring block's prediction block boundary filter application information (whether applied or not) stored in the line buffer as the reference sample filter application information (whether applied or not), the prediction block filter application information (whether applied or not), or the prediction block boundary filter application information (whether applied or not) of a neighboring block of the current block and uses the set information for intra prediction of the current block.

In a yet further example, the encoding apparatus or the decoding apparatus sets a neighboring block's reference sample filter coefficient, prediction block filter coefficient, or prediction block boundary filter coefficient stored in the line buffer as the reference sample filter coefficient, prediction block filter coefficient, or prediction block boundary filter coefficient of a neighboring block of the current block and uses the set information for intra prediction of the current block.

In a yet further example, the encoding apparatus or the decoding apparatus sets a neighboring block's reconstructed luma samples, reconstructed chroma samples, residual luma samples, or residual chroma samples stored in the line buffer as the reconstructed luma samples, the reconstructed chroma samples, the residual luma samples, or the residual chroma samples of a neighboring block of the current block and uses the set information for intra prediction of the current block.

In a yet further example, the encoding apparatus or the decoding apparatus sets a neighboring block's primary transform utilization information (whether used or not), secondary transform utilization information (whether used or not), primary transform index, or secondary transform index stored in the line buffer as the primary transform utilization information (whether used or not), secondary transform utilization information (whether used or not), primary transform index, or secondary transform index of a neighboring block of the current block and uses the set information for transform or inverse transform of the current block.

In a yet further example, the encoding apparatus or the decoding apparatus sets a neighboring block's coding block flag stored in the line buffer as the coding block flag of a neighboring block of the current block and uses the set information for transform or inverse transform of the current block.

In a yet further example, the encoding apparatus or the decoding apparatus sets a neighboring block's luma transform coefficient or chroma transform coefficient stored in the line buffer as the luma transform coefficient or chroma transform coefficient of a neighboring block of the current block for transform or inverse transform of the current block.

In a yet further example, the encoding apparatus or the decoding apparatus sets a neighboring block's coding block flag stored in the line buffer as the coding block flag of a neighboring block of the current block and uses the set information for quantization or dequantization of the current block.

In a yet further example, the encoding apparatus or the decoding apparatus sets a neighboring block's quantization parameter or residual quantization parameter stored in the line buffer as the quantization parameter or the residual quantization parameter of a neighboring block of the current block and uses the set information for quantization or dequantization of the current block.

In a yet further example, the encoding apparatus or the decoding apparatus sets a neighboring block's luma quantization level or chroma quantization level stored in the line buffer as the luma quantization level or chroma quantization level of a neighboring block of the current block and uses the set information for quantization or dequantization of the current block.

Further alternatively, the encoding apparatus or the decoding apparatus sets a neighboring block's block type or block partition information (whether a block is partitioned by a quad tree, whether a block is partitioned by a binary tree, or whether a block is partitioned by a ternary tree) stored in the line buffer as the block type or the block partition information of a neighboring block of the current block and uses the set information for entropy-encoding/decoding of the current block.

In a yet further example, the encoding or decoding apparatus sets a neighboring block's binary tree partition direction (horizontal direction or vertical direction) or binary tree partition type (symmetric partition or asymmetric partition) stored in the line buffer as the binary tree partition direction (horizontal direction or vertical direction) or binary tree partition type (symmetric partition or asymmetric partition) of a neighboring block of the current block and uses the set information for entropy encoding/decoding of the current block.

In a yet further example, the encoding or decoding apparatus sets a neighboring block's prediction mode (intra prediction or inter prediction) stored in the line buffer as the prediction mode (intra prediction or inter prediction) of a neighboring block of the current block and uses the set information for entropy encoding/decoding of the current block.

In a yet further example, the encoding apparatus or the decoding apparatus sets a neighboring block's binarization/inverse binarization method stored in the line buffer as a prediction mode (intra prediction or inter prediction) of a neighboring block of the current block and uses the set information for entropy encoding/decoding of the current block.

In a yet further example, the encoding apparatus or the decoding apparatus sets a neighboring block's significant coefficient flag or last significant coefficient flag stored in the line buffer as the significant coefficient flag or last significant coefficient flag of a neighboring block of the current block and uses the set information for entropy encoding/decoding of the current block.

In a yet further example, the encoding apparatus or the decoding apparatus sets a neighboring block's transform coefficient level scanning method stored in the line buffer as the transform coefficient level scanning method of a neighboring block of the current block and uses the set information for entropy encoding/decoding of the current block.

In a yet further example, the encoding apparatus or the decoding apparatus sets a neighboring block's deblocking filter coefficient, deblocking filter tap, or deblocking filter strength stored in the line buffer as the deblocking filter coefficient, deblocking filter tap, or deblocking filter strength of a neighboring block of the current block and uses the set information for in-loop filtering of the current block.

In a yet further example, the encoding apparatus or the decoding apparatus sets a neighboring block's adaptive sample offset application information (whether applied or not), adaptive sample offset value, adaptive sample offset category, or adaptive sample offset type stored in the line buffer, as information of the adaptive sample offset application information (whether applied or not), adaptive sample offset value, adaptive sample offset category, or adaptive sample offset type of a neighboring block of the current block and uses the set information for in-loop filtering of the current block.

In a yet further example, the encoding apparatus or the decoding apparatus sets a neighboring block's adaptive loop filter application information (whether applied or not), adaptive loop filter coefficient, adaptive loop filter tap, adaptive loop filter shape/form, or adaptive loop filter index stored in the line buffer, as the adaptive loop filter application information (whether applied or not), adaptive loop filter coefficient, adaptive loop filter tap, adaptive loop filter shape/form, or adaptive loop filter index of a neighboring block of the current block and uses the set information for loop-filtering of the current block.

In the embodiments described above, when the current block is adjacent to a boundary of a CTU, a slice, a tile, or a tile group, at least one piece of the information of the current block is saved in the line buffer.

Figure 16:
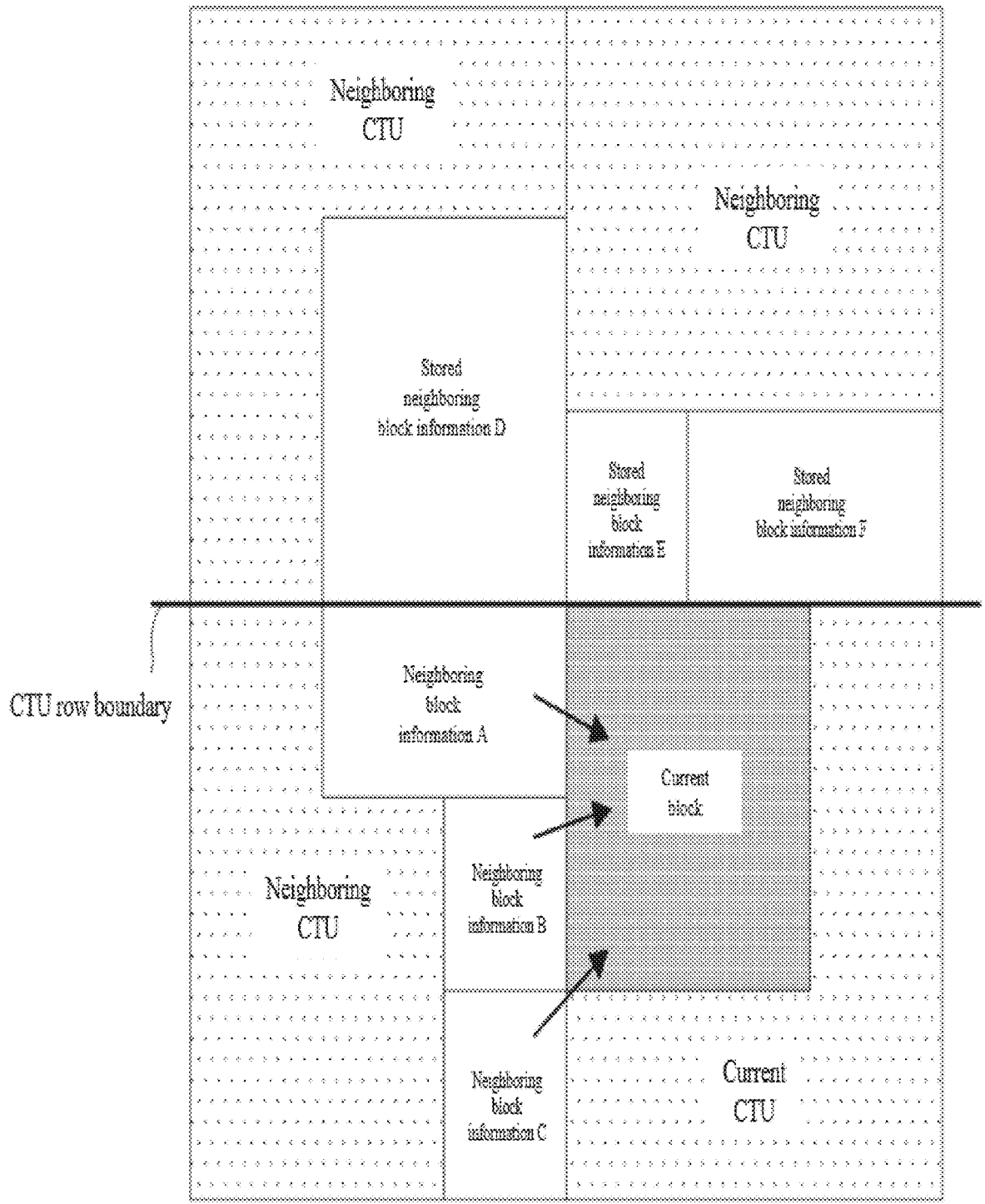

FIG. 16 is a diagram illustrating methods in which information of a neighboring block is used for processing of a current block located at a boundary of a CTU row, according to various embodiments of the present invention.

As illustrated in FIG. 16, when a neighboring block is present outside a row or column boundary of the current CTU, the encoding apparatus or the decoding apparatus performs a predetermined inverse operation on at least one piece of the neighboring block's information stored in the line buffer and then replaces the at least one piece of the information of the neighboring block with the resulting value of the inverse operation. That is, the encoding apparatus or the decoding apparatus sets the resulting value of the inverse operation as the at least one piece of the information of the neighboring block.

Alternatively, the encoding apparatus or the decoding apparatus performs a predetermined operation on at least one piece of the information of the current block and stores the resulting value of the operation in the line buffer. The at least one piece of the information of the current block is at least one piece of the information of the current block produced by the encoding/decoding.

Solid arrows in FIG. 16 mean that at least one piece of information of neighboring blocks is used for processing of the current block. On the other hand, dotted arrows in FIG. 16 mean that a predetermined inverse operation is performed on at least one piece of the information of a neighboring block which is present outside a row or column boundary of the current CTU and the resulting value of the inverse operation is set as the at least one piece of the information of the neighboring block.

For example, when a neighboring block is present outside a row or column boundary of the current CTU, the encoding apparatus or the decoding apparatus changes the motion vector of the neighboring block from a per 1/T-sample motion vector to a per 1/S-sample motion vector, sets the per 1/S-sample motion vector as the motion vector of the neighboring block, and uses it for inter prediction of the current block.

When the current block is adjacent to a boundary of a CTU, a slice, a tile, or a tile group, the coding apparatus or the decoding apparatus changes the motion vector of the current block from a per 1/S-sample motion vector to a per 1/T-sample motion vector and saves the changed motion vector in the line buffer.

For example, when a neighboring block is present outside a row or column boundary of the current CTU, the encoding apparatus or the decoding apparatus changes the motion vector of the neighboring block from a per integer-sample motion vector to a per ½-sample motion vector, a per ¼-sample motion vector, a per ⅛-sample motion vector, or a per-1/16 sample motion vector, sets the changed motion vector as the motion vector of a neighboring block of the current block, and uses it for inter prediction of the current block.

When the current block is adjacent to a boundary of a CTU, a slice, a tile, or the like, the encoding apparatus or the decoding apparatus changes the motion vector of the current block from a per ½-sample motion vector, a per ¼-sample motion vector, a per ⅛-sample motion vector, or a per 1/16-sample motion vector to a per integer-sample motion vector, and saves the changed motion vector in the line buffer.

For example, when a neighboring block is present outside a row or column boundary of the current CTU, the encoding apparatus or the decoding apparatus changes the neighboring block's motion vector stored in the line buffer from a per ¼-sample motion vector to a per ⅛-sample motion vector or a per 1/16-sample motion vector, sets the changed motion vector as the motion vector of a neighboring block of the current block, and uses it for inter prediction of the current block.

In addition, when the current block is adjacent to a boundary of a CTU, a slice, a tile, a tile group or the like, the encoding apparatus or the decoding apparatus changes the motion vector of the current block from a per ⅛-sample motion vector, a per 1/16-sample motion vector, or the like to a per ¼-sample motion vector and saves the changed motion vector in the line buffer.

For example, when a neighboring block is present outside a row or column boundary of the current CTU, the encoding apparatus or the decoding apparatus changes the neighboring block's motion vector difference stored in the line buffer from a per 1/T-sample motion vector different to a per 1/S-sample motion vector difference, sets the changed motion vector difference as the motion vector difference of the neighboring block of the current block, and uses it for the current block.

In addition, when the current block is adjacent to a boundary of a CTU, a slice, a tile, a tile group, or the like, the encoding apparatus or the decoding apparatus changes the motion vector difference of the current block from a per 1/S-sample motion vector difference to a per 1/T-sample motion vector difference and saves the changed motion vector difference in the line buffer.

For example, when a neighboring block is present outside a row or column boundary of the current CTU, the encoding apparatus or the decoding apparatus changes the neighboring block's motion vector difference stored in the line buffer from a per integer-sample motion vector difference to a per ½-sample motion vector difference, a per ¼-sample motion vector difference, a per ⅛-sample motion vector difference, or a per 1/16-sample motion vector difference, sets the changed motion vector difference as the motion vector difference of the neighboring block of the current block, and uses it for inter prediction of the current block.

When the current block is adjacent to a boundary of a CTU, a slice, a tile, or the like, the encoding apparatus or the decoding apparatus changes the motion vector difference of the current block from a per ½-sample motion vector, a per ¼-sample motion vector, a per ⅛-sample motion vector, or a per 1/16-sample motion vector to a per integer-sample motion vector, and saves the changed motion vector difference in the line buffer.

When a neighboring block is present outside a row or column boundary of the current CTU, the encoding apparatus or the decoding apparatus changes the neighboring block's motion vector difference stored in the line buffer from a per ¼-sample motion vector to a per ⅛-sample motion vector or a per 1/16-sample motion vector, sets the changed motion vector difference as the motion vector difference of a neighboring block of the current block, and uses it for inter prediction of the current block.

When the current block is adjacent to a boundary of a CTU, a slice, a tile, a tile group or the like, the encoding apparatus or the decoding apparatus changes the motion vector difference of the current block from a per ⅛-sample motion vector difference, a per 1/16-sample motion vector difference, or the like to a per ¼-sample motion vector difference and saves the changed motion vector difference in the line buffer.

In the embodiments described above, S and T are positive integers or fractional numbers. Here, S and T are independent of each other. For example, S and T are the same value or different values.

Specifically, when the encoding apparatus or the decoding apparatus saves low-precision motion vectors, S may have a value equal to or greater than that of T. When the encoding apparatus or the decoding apparatus saves high-precision motion vectors, T may have a value equal to or greater than that of S. For example, each of the values of S and T is 1/64, 1/32, 1/16, 1/8, 1/4, 1/2, 1, 2, 4, 8, or 16.

However, the values of S and T are not limited to the above-mentioned examples. When the precision of a motion vector or a motion vector difference is changed from a 1/T sample to a 1/S sample, motion vector values or motion vector difference values are shifted left by a predetermined value (left-shift operation).

When the precision of a motion vector or a motion vector difference is changed from a 1/S sample to a 1/T sample, motion vector values or motion vector difference values are shifted right by a predetermined value (right shift operation). The predetermined value is a value preset in the encoding apparatus and the decoding apparatus or a value signaled from the encoding apparatus to the decoding apparatus.

The process of performing the left shift operation or the right shift operation to change the precision of the motion vectors or the motion vector differences is performed during one or more processes selected from among motion vector candidate list construction, merge candidate list construction, sub-block-based merge candidate list construction, and the like. In addition, the process of determining whether there is a motion vector or a motion vector difference the same as the motion vector or the motion vector difference generated through the precision change is performed during at least one process selected from among motion vector candidate list construction, merge candidate list construction, sub-block-based merge list construction, and the like.

For example, when a motion vector or a motion vector difference equal to the motion vector or motion vector difference generated through the precision change exists in at least one of the motion vector candidate list, the merge candidate list, and the sub-block-based merge candidate list, the encoding apparatus or decoding apparatus prevents duplication of redundant motion vectors or motion vector differences in the motion vector candidate list, the merge candidate list, and/or the sub-block-based merge candidate list.

Alternatively, when a motion vector or motion vector difference equal to the motion vector or motion vector difference generated by the precision change is present in none of the motion vector candidate list, the merge candidate list, and the sub-block-based merge candidate list, the encoding apparatus or the decoding apparatus prevents makes the motion vector or the motion vector difference exist in at least one of the motion vector candidate list, the merge candidate list, and the sub-block-based merge candidate list.

In this case, at least one of T and S is a predetermined value present in the encoding apparatus and the decoding apparatus, or a value signaled to the decoding apparatus from the encoding apparatus.

Alternatively, when a neighboring block is present outside a row or column boundary of the current CTU, the encoding apparatus or the decoding apparatus shifts a neighboring block's luma intra prediction mode or chroma intra prediction mode stored in the line buffer to the left by a predetermined value M, sets the resulting value of the left-shift operation as the luma intra prediction mode or chroma intra prediction mode of a neighboring block of the current block, and uses the set information for intra prediction of the current block.

When the current block is adjacent to a boundary of a CTU, a slice, a tile, or a tile group, the encoding apparatus or the decoding apparatus shifts the luma intra prediction mode or chroma intra prediction mode of the current block to the right by a predetermined value N and saves the resulting value of the right-shift operation in the line buffer.

Specifically, when a neighboring block is present outside a row or column boundary of the current CTU, the encoding apparatus or the decoding apparatus shifts the neighboring block's luma intra prediction mode or chroma intra prediction mode stored in the line buffer to the left by a value of 1, sets the resulting value of the left shift operation as the luma intra prediction mode or chroma intra prediction mode of a neighboring block of the current block, and uses the set information for intra prediction of the current block.

When the current block is adjacent to a boundary of a CTU, a slice, a tile, or a tile group, the encoding apparatus or the decoding apparatus shifts the luma intra prediction mode or chroma intra prediction mode of the current block to the right by a value of 1 and saves the resulting value of the right shift operation in the line buffer.

Further alternatively, when a neighboring block is present outside a row or column boundary of the current CTU, the encoding apparatus or the decoding apparatus performs a left shift operation, by a predetermined value, on the neighboring block's reconstructed luma sample, reconstructed chroma sample, residual luma sample, or residual chroma sample stored in the line buffer, sets the resulting value of the left shift operation as the reconstructed luma sample, reconstructed chroma sample, reconstructed residual luma sample, or reconstructed residual chroma sample of a neighboring block of the current block, and uses the set information for intra prediction of the current block.

When the current block is adjacent to a boundary of a CTU, a slice, a tile, or a tile group, the encoding apparatus or the decoding apparatus performs a right shift operation, by a predetermined value N, on the reconstructed luma sample, reconstructed chroma sample, residual luma sample, or residual chroma sample, and saves the resulting value of the right shift operation in the line buffer.

Alternatively, when a neighboring block is present outside a row or column boundary of the current CTU, the encoding apparatus or the decoding apparatus performs a left shift operation by a predetermined value M on the neighboring block's luma or chroma transform coefficient stored in the line buffer, sets the resulting value of the left shift operation as the luma or chroma transform coefficient of a neighboring block of the current block, and uses the set information for transform or inverse transform of the current block.

When the current block is adjacent to a boundary of a CTU, a slice, a tile, or a tile group, the encoding apparatus or the decoding apparatus performs a right shift operation on the luma or chroma transform coefficient of the current block by a predetermined value N and saves the resulting value of the right shift operation in the line buffer.

Further alternatively, when a neighboring block is present outside a row or column boundary of the current CTU, the encoding apparatus or the decoding apparatus performs a left shift operation on the neighboring block's quantization parameter or the neighboring block's residual quantization parameter stored in the line buffer by a predetermined value M, sets the resulting value of the left shift operation as the quantization parameter or the residual quantization parameter of a neighboring block, and uses the set information for quantization or dequantization of the current block.

When the current block is adjacent to a boundary of a CTU, a slice, a tile, or a tile group, the encoding apparatus or the decoding apparatus performs a right shift operation by a predetermined value N on the quantization parameter or the residual quantization parameter of the current block and saves the resulting value of the right shift operation in the line buffer.

Further alternatively, when a neighboring block is present outside a row or column boundary of the current CTU, the encoding apparatus or the decoding apparatus performs a left shift operation by a predetermined value M on the neighboring block's luma or chroma quantization level stored in the line buffer, sets the resulting value of the left shift operation as the luma or chroma quantization level of a neighboring block of the current block, and uses the set information for quantization or inverse quantization of the current block.

When the current block is adjacent to a boundary of a CTU, a slice, a tile, or a tile group, the encoding apparatus or the decoding apparatus performs a right shift operation by a predetermined value N on the luma quantization level or the chroma quantization level of the current block and saves the resulting operation of the right shift operation in the line buffer.

Alternatively, the encoding apparatus or the decoding apparatus performs a left shift operation on the motion vector of a luma block, which is stored in a memory, by a predetermined value M, sets the resulting value of the left shift operation as the motion vector of the luma block corresponding to a chroma block of the current block, and uses the set information for inter prediction of the chroma block. In addition, the encoding apparatus or the decoding apparatus performs a right shift operation on the motion vector of the luma block of the current block by a predetermined value N and saves the resulting value of the right shift operation in the memory.

For example, the encoding apparatus or the decoding apparatus performs a left shift operation on each component (x component, y component) of the motion vector of a luma block stored in the memory by a value of 1, sets the resulting value of the left shift operation as the motion vector of a luma block corresponding to a chroma block of the current block, and uses the set information for inter prediction of the chroma block corresponding to the luma block of the current block. In addition, the encoding apparatus or the decoding apparatus performs a right shift operation on each component (x component, y component) of the motion vector of the luma block of the current block by a value of 1 and saves the resulting value of the right shift operation in the memory.

Alternatively, the encoding apparatus or the decoding apparatus converts a motion vector value used for the inter prediction of the current block into a floating-point number representation, and saves the floating-point number representation value in the memory. The floating-point number representation value is converted back into the motion vector value and is used for the inter prediction of a neighboring block. Specifically, the encoding apparatus or the decoding apparatus converts a motion vector value represented by N bits into a floating-point number represented by M bits. Here, the M bits are composed of R mantissa bits and P exponent bits. For example, N, M, R, and P are positive integers and are 18, 10, 6, and 4, respectively.

For example, a motion vector used for the inter prediction of the current block can be converted into a floating-point number representation according to Equation 1 shown below.

$s = mv[compIdx] >> 17$ $f = Floor(Log_2((mv[compIdx]^s)|31)) - 4$ $mask = (-1 << f) >> 1$ $round = (1 << f) >> 2$ $mv[compIdx] = (mv[compIdx] + round) \ \& \ mask$     [Expression 1]

Here, mv[ ] is a motion vector value used in the inter prediction of the current block, and compIdx is a value indicating the component of the motion vector. For example, compIdx is an index value indicating the x value or the y value of the motion vector, an index value indicating the luma or chroma component of the motion vector, or an index value indicating the prediction direction (for example, L0 or L1). On the other hand, Floor( ) is a function that discards digits under the decimal point.

In another example, when the scaled motion vector value stored in a memory is not included in a predetermined range, the encoding apparatus or the decoding apparatus sets the scaled motion vector value of the current block to the minimum value or the maximum value of the predetermined range, and uses the set information for inter prediction of the current block. Specifically, when the scaled motion vector value stored in the memory is smaller than the minimum value of the predetermined range, the encoding apparatus or the decoding apparatus sets the scaled motion vector value to the minimum value of the predetermined range and uses the scaled motion vector value that is set to the minimum value for inter prediction of the current block. When the scaled motion vector value is larger than the maximum value of the predetermined range, the encoding apparatus or the decoding apparatus sets the scaled motion vector value to the maximum value of the predetermined range, and use the scaled motion vector value that is set to the maximum value for inter prediction of the current block. When the scaled motion vector value of the current block is outside the predetermined range, the encoding apparatus or the decoding apparatus sets the scaled motion vector value to the minimum value or the maximum value of the predetermined range, and saves the set information in the memory. For example, the predetermined range may be $-2^N$ to $2^N-1$. Here, N is a positive integer and is, for example, 17. When N is 17, $-2^N$ has a value of $-131072$, and $2^N-1$ has a value of 131071.

In a further example, the encoding apparatus or the decoding apparatus performs a left shift operation, by a predetermined value M, on an intra prediction mode of a luma block, which is stored in the memory, sets the resulting value of the left shift operation as an intra prediction mode of a luma block corresponding to a chroma block of the current block, and uses the set information for intra prediction of the chroma block. The encoding apparatus or the decoding apparatus performs a right shift operation by a predetermined value N on the intra prediction mode of the luma block of the current block, and saves the resulting value of the right shift operation in the memory.

In a yet further example, the encoding apparatus or the decoding apparatus performs a left shift operation by a predetermined value M on the intra prediction mode of the chroma block stored in the memory, sets the resulting value of the left shift operation as an intra prediction mode of the chroma block corresponding to a luma block of the current block, and uses it for intra prediction of the luma block. In a yet further example, the encoding apparatus or the decoding apparatus may perform a right shift operation on the intra prediction mode of a chroma block of the current block by a predetermined value N and saves the resulting value of the right shift operation in the memory.

In a yet further example, the encoding apparatus or the decoding apparatus may perform a left shift operation, by a predetermined value M, on an intra prediction mode of a first-component chroma block, which is stored in the memory, sets the resulting value of the left shift operation as the intra prediction mode of the first-component chroma block corresponding to a second-component chroma block of the current block, and uses the set information for intra prediction of the second-component chroma block of the current block. In a yet further example, the encoding apparatus or the decoding apparatus may perform a right shift operation by a predetermined value N on the intra prediction mode of the first-component chroma block of the current block, and saves the resulting value of the right shift operation in the memory.

In a yet further example, the encoding apparatus or the decoding apparatus may perform a left shift operation by a predetermined value M on an intra prediction mode of a second-component chroma block stored in the memory, sets the resulting value of the left shift operation as an intra prediction mode of a second-component chroma block corresponding to a first-component chroma block of the current block, and uses the set information for intra prediction of the first-component chroma block. In a yet further example, the encoding apparatus or the decoding apparatus performs a right shift operation on an intra prediction mode of a second-component chroma block of the current block by a predetermined value N and saves the resulting value of the right shift operation in the memory.

In a yet further example, the encoding apparatus or the decoding apparatus performs a left shift operation, by a predetermined value M, on the reconstructed luma sample or the residual luma sample of a luma block stored in the memory, sets the resulting value of the left shift operation as the reconstructed luma sample or the residual luma sample of the luma block corresponding to a chroma block of the current block, and uses the set information for intra prediction of the chroma block. In a yet further example, a right shift operation is performed on the reconstructed luma sample or the residual luma sample of the luma block by a predetermined value N and the resulting value of the right shift operation is saved in the memory.

In a yet further example, the encoding apparatus or the decoding apparatus performs a left shift operation by a predetermined value M on the reconstructed chroma sample or the residual chroma sample of a chroma block stored in the memory, sets the resulting value of the left shift operation as the reconstructed chroma sample or the residual chroma sample of the chroma block corresponding to a luma block of the current block, and uses the set information for intra prediction of the luma block. In a yet further example, the encoding apparatus or the decoding apparatus performs a right shift operation on the reconstructed chroma sample or the residual chroma sample of a chroma block of the current block by a predetermined value N and saves the resulting value of the right shift operation in the memory.

In a yet further example, the encoding apparatus or the decoding apparatus performs a left shift operation, by a predetermined value M, on the reconstructed first-component chroma sample or the residual first-component chroma sample of a first-component chroma block, stored in the memory, sets the resulting value of the left shift operation as the reconstructed first-component chroma sample or the residual first-component chroma sample of the first-component chroma block corresponding to a second-component chroma-component block of the current block, and uses the set information for intra prediction of the second-component chroma block. In a yet further example, the encoding apparatus or the decoding apparatus performs a right shift operation on the restored first-component chroma sample or the residual first-component chroma sample of the first-component chroma block by a predetermined value N, and saves the resulting value of the right shift operation in the memory.

In a yet further example, the encoding apparatus or the decoding apparatus performs a left shift operation on the reconstructed second-component chroma sample or the residual second-component chroma sample of a second-component chroma block stored in the memory by a predetermined value M, sets the resulting value of the left shift operation as the second-component chroma sample or the residual second-component chroma sample of the second-component chroma block corresponding to a first-component chroma block of the current block, and uses the set information for intra prediction of the first-component chroma block of the current block. In a yet further example, the encoding apparatus or the decoding apparatus performs a right shift operation on the reconstructed second-component chroma sample or the residual second-component chroma sample of a second-component chroma block by a predetermined value N, and saves the resulting value of the right shift operation in the memory.

In a yet further example, the encoding apparatus or the decoding apparatus performs a left shift operation on a transform coefficient of a luma block stored in the memory by a predetermined value M to determine a transform coefficient of a luma block corresponding to a chroma block, and uses the determined transform coefficient for transform or inverse transform of the chroma block. In addition, the encoding apparatus or the decoding apparatus performs a right shift operation on the transform coefficient of the luma block of the current block by a predetermined value N and saves the resulting value of the right shift operation in the memory.

In a yet further example, the encoding apparatus or the decoding apparatus performs a left shift operation on a quantization parameter or a residual quantization parameter of a luma block stored in the memory by a predetermined value M to determine a quantization parameter or a residual quantization parameter of a luma block corresponding to a chroma block of the current block, and uses the determined quantization parameter for quantization or dequantization of the chroma block. In addition, the encoding apparatus or the decoding apparatus performs a right shift operation by a predetermined value N on the quantization parameter or the residual quantization parameter of the luma block in the current block, and saves the resulting value of the right shift operation in the memory.

In a yet further example, the encoding apparatus or the decoding apparatus performs a left shift operation on the quantization level of a luma block stored in the memory by a predetermined value M to determine the quantization level of a luma block corresponding to a chroma block of the current block, and uses the determined quantization level for quantization or dequantization of the chroma block. In addition, the encoding apparatus or the decoding apparatus performs a right shift operation on the quantization level of a luma block of the current block by a predetermined value N and saves the resulting value of the right shift operation in the memory.

In the embodiments described above, M and N are positive integers. For example, M and N are the same value or different values. In addition, M and N each have at least one value selected from among 1, 2, 3, 4, 5, and 6.

Figure 17:
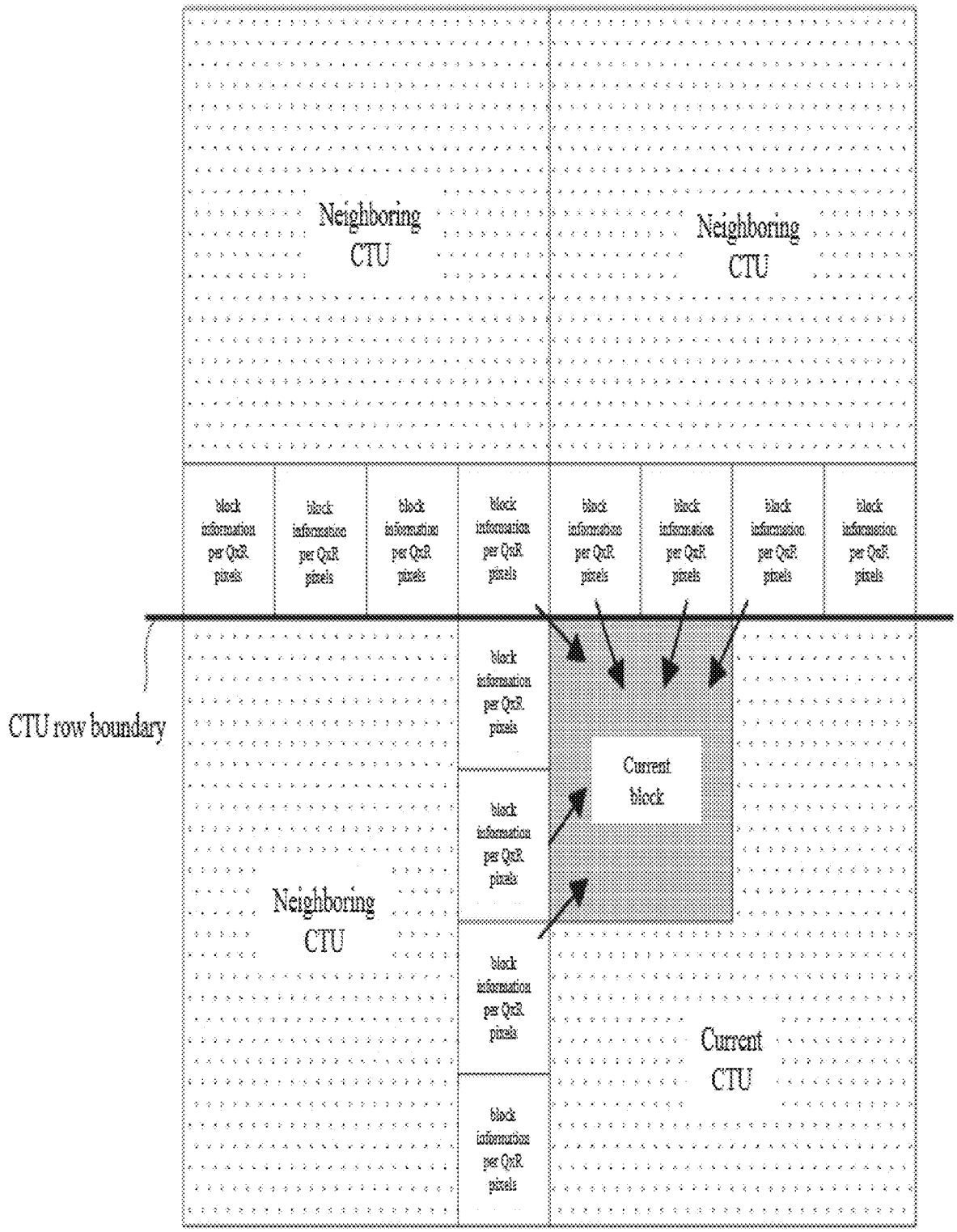
Figure 18:
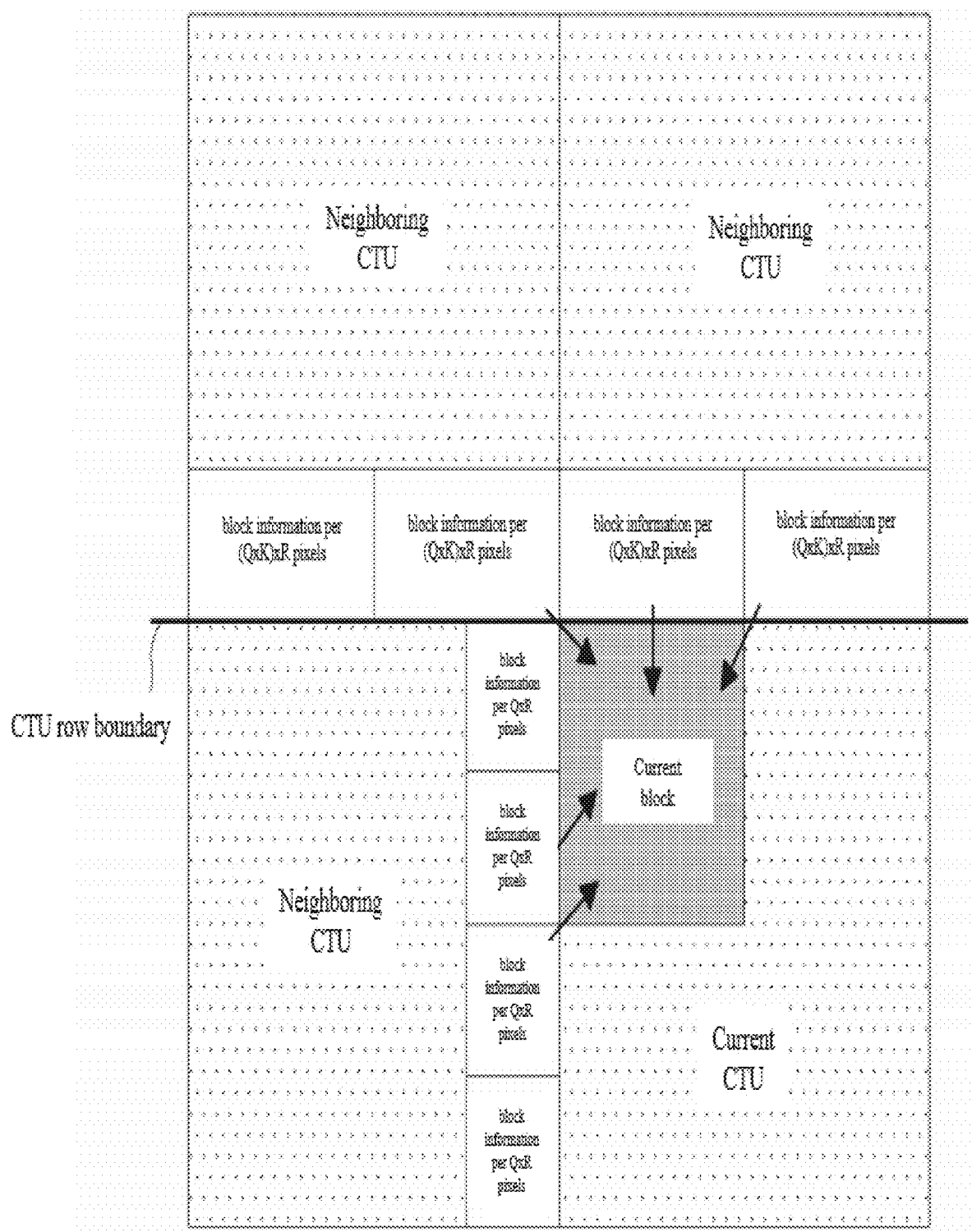

FIGS. 17 and 18 are diagrams illustrating methods in which information of a neighboring block is used for processing of a current block located at a boundary of a CTU row, according to various embodiments of the present invention.

When the encoding apparatus or the decoding apparatus saves at least one piece of the information of the current block in the line buffer, the encoding apparatus or the decoding apparatus saves at least one piece of the information of the current block as at least one piece of a neighboring block. In this case, at least one piece of the information to be saved in the line buffer is changed from information of a Q*R block to information of a (Q*K)×R block. In this case, the line buffer is less consumed.

In this case, Q, R, or K is a positive integer. For example, Q, R, or K is a fixed value predefined in the encoding apparatus and the decoding apparatus. For example, when Q and R each are 4 and K is 2, block information is changed from 4×4-size block information to 8×4-size block information and the resulting block information is saved. Therefore, information of one block is saved in the line buffer instead of information of two blocks. That is, since the number of pieces of the information to be saved is reduced, the size of the line buffer is reduced.

When a neighboring block is present outside a row or column boundary of the current CTU, the encoding apparatus or the decoding apparatus does not save the information of the neighboring blocks on a per Q×R block basis in the line buffer but saves the information of the neighboring blocks on a per (Q*K)×R block basis. On the other hand, the encoding apparatus or the decoding apparatus changes the Q×R-size block information stored in the line buffer to (Q*K)×R-size block information and uses the resulting block information in the process of encoding/decoding the current block.

To reduce the size of the line buffer, the encoding apparatus or the decoding apparatus replaces at least one piece of the information of a neighboring block to be used for processing of the current block, with at least one piece of information of another neighboring block adjacent to a specific neighboring block, rather than with at least one piece of the information of the specific neighboring block stored in the line buffer. In this case, at least one piece of the information of the current block will be saved in the line buffer.

For example, when a neighboring block is present outside a row or column boundary of the current CTU, the encoding apparatus or the decoding apparatus sets the motion vector or the motion vector difference of a neighboring block, which is stored in the line buffer, as the motion vector of a neighboring block to be used for processing of the current block, and uses the set information for inter prediction of the current block. When the current block is adjacent to a boundary of a CTU, a slice, a tile, or a tile group, the encoding apparatus or the decoding apparatus sets the motion vector value or the motion vector difference value of the current block as the motion vector value or the motion vector difference value of a neighboring block and saves the changed value in the line buffer.

In another example, when a neighboring block is present outside a row or column boundary of the current CTU, the encoding apparatus or the decoding apparatus sets a neighboring block's reference picture index stored in the line buffer as the reference picture index of a neighboring block to be used for processing of the current block, and uses the set information for inter prediction of the current block. When the current block is adjacent to a border of a CTU, a slice, a tile, or a tile group, the encoding apparatus or the decoding apparatus sets the reference picture index value of the current block as the reference picture index value of a neighboring block and saves it in the line buffer.

In another example, when a neighboring block is present outside a row or column boundary of the current CTU, the encoding apparatus or the decoding apparatus sets a neighboring block's inter prediction indicator stored in the line buffer as the inter prediction indicator of a neighboring block to be used for processing of the current block and uses the set information for inter prediction of the current block. When the current block is adjacent to a boundary of a CTU, a slice, a tile, or a tile group, the encoding apparatus or the decoding apparatus sets the inter prediction indicator value of the current block as the inter prediction indicator value of a neighboring block and saves it in the line buffer.

In another example, when a neighboring block is present outside a row or column boundary of the current CTU, the encoding apparatus or the decoding apparatus sets the neighboring block's motion vector prediction index or the neighboring block's merge index stored in the line buffer as the motion vector prediction index or the merge index of a neighboring block to be used for processing of the current block, and uses the set information for inter prediction of the current block. When the current block is adjacent to a boundary of a CTU, a slice, or a tile, the encoding apparatus and the decoding apparatus sets the motion vector prediction index value or the merge index value of the current block as the motion vector prediction index value or the merge index value of a neighboring block, and saves it in the line buffer.

In another example, when a neighboring block is present outside a row or column boundary of the current CTU, the encoding apparatus or the decoding apparatus sets the neighboring block's interpolation filter coefficient stored in the line buffer as the interpolation filter coefficient of a neighboring block to be used for processing of the current block, and uses the set information for inter prediction of the current block. When the current block is adjacent to a border of a CTU, a slice, a tile, or a tile group, the encoding apparatus and the decoding apparatus save the interpolation filter coefficient of the current block as the reference picture index value of a neighboring block and saves it in the line buffer.

In another example, when a neighboring block is present outside a row or column boundary of the current CTU, the encoding apparatus or the decoding apparatus sets the neighboring block's motion vector precision stored in the line buffer as the motion vector precision of a neighboring block to be used for processing of the current block and uses the set information for the inter prediction of the current block. When the current block is adjacent to a boundary of a CTU, a slice, a tile, or a tile group, the encoding apparatus or the decoding apparatus sets the motion vector precision of the current block as the motion vector precision of a neighboring block and saves it in the line buffer.

In a further example, when a neighboring block is present outside a row or column boundary of the current CTU, the encoding apparatus or the decoding apparatus sets a neighboring block's luma intra prediction mode or the neighboring block's chroma intra prediction mode stored in the line buffer as the luma intra prediction block or the chroma intra prediction block of a neighboring lock to be used for processing of the current block and uses the set information for intra prediction of the current block. When the current block is adjacent to a boundary of a CTU, a slice, a tile, or a tile group, the encoding apparatus or the decoding apparatus sets the luma intra prediction mode value or the chroma intra prediction mode value of the current block as the luma intra prediction mode value or the chroma intra prediction mode value of a neighboring block and saves it in the line buffer.

In a further example when a neighboring block is present outside a row or column boundary of the current CTU, the encoding apparatus or the decoding apparatus sets the neighboring block's reconstructed luma sample, the neighboring block's reconstructed chroma sample, the neighboring block's residual luma sample, or a neighboring block's residual chroma sample stored in the line buffer, as the reconstructed luma sample, the reconstructed chroma sample, the reconstructed residual luma sample, or the reconstructed residual chroma sample of a neighboring block to be used for processing of the current block, and uses the set information for the intra prediction of the current block. When the current block is adjacent to a boundary of a CTU, a slice, a tile, or a tile group, the encoding apparatus or the decoding apparatus sets the reconstructed luma sample, the reconstructed chroma sample, the residual luma sample, or the residual chroma sample of the current block as the reconstructed luma sample, the reconstructed chroma sample, the residual luma sample, or the residual chroma sample of a neighboring block and saves it in the line buffer.

In a further example, the encoding apparatus or the decoding apparatus sets the neighboring block's primary transform utilization information (whether used or not), secondary transform utilization information (whether used or not), primary transform index, or secondary transform index stored in the line buffer as the primary transform utilization information (whether used or not), secondary transform utilization information (whether used or not), primary transform index, or secondary transform index of a neighboring block to be used for processing of the current block and uses the set information for transform or inverse transform of the current block. In addition, when the current block is adjacent to a boundary of a CTU, slice, tile, or tile group, the encoding apparatus or the decoding apparatus sets the primary transform utilization information (whether used or not), secondary transform utilization information (whether used or not), primary transform index, or secondary transform index of the current block as the primary transform utilization information (whether used or not), secondary transform utilization information (whether used or not), primary transform index, or secondary transform index of a neighboring block and saves it in the line buffer.

In a further example, when a neighboring block is present outside a row or column boundary of the current CTU, the encoding apparatus or the decoding apparatus sets the neighboring block's quantization parameter or the neighboring block's residual quantization parameter stored in the line buffer as the quantization parameter or the residual quantization parameter of a neighboring block to be used for processing of the current block, and uses the set information for quantization or dequantization of the current block. When the current block is adjacent to a boundary of a CTU, a slice, a tile, or a tile group, the encoding apparatus or the decoding apparatus sets the quantization value or the residual quantization parameter value of the current block as the quantization parameter value or the residual quantization parameter value of a neighboring block and saves it in the line buffer.

tgIn a further example, when a neighboring block is present outside a row or column boundary of the current CTU, the encoding apparatus or the decoding apparatus sets the neighboring block's deblocking filter coefficient, deblocking filter tap, or deblocking filter strength stored in the line buffer as the deblocking filter coefficient, deblocking filter tap, or deblocking filter strength of a neighboring block to be used for processing of the current block and uses the set information for in-loop filtering of the current block. When the current block is adjacent to a boundary of a CTU, slice, or tile, the encoding apparatus or the decoding apparatus sets the value of the deblocking filter coefficient, the deblocking filter tap, or the deblocking filter strength of the current block as the value of the deblocking filter coefficient, the deblocking filter tap, or the deblocking filter strength of a neighboring block and saves it in the line buffer.

In a further example, when a neighboring block is present outside a row or column boundary of the current CTU, the encoding apparatus or the decoding apparatus sets the neighboring block's adaptive sample offset application information (whether applied or not), adaptive sample offset value, adaptive sample offset category, or adaptive sample offset type stored in the line buffer, as the adaptive sample offset application information (whether applied or not), the adaptive sample offset value, the adaptive sample offset category, the adaptive sample offset type of a neighboring block to be used for processing of the current block and uses the set information for in-loop filtering of the current block. In addition, when the current block is adjacent to a boundary of a CTU, slice, tile, or tile group, the encoding apparatus or the decoding apparatus sets the value of the adaptive sample offset application information (whether applied or not), adaptive sample offset value, adaptive sample offset category, or adaptive sample offset type of the current block as the value of the adaptive sample offset application information (whether applied or not), adaptive sample offset value, adaptive sample offset category, or adaptive sample offset type of a neighboring block and saves it in the line buffer.

In another example, when a neighboring block is present outside the row or column boundary of the current CTU, the encoding apparatus or the decoding apparatus sets the neighboring block's adaptive loop filter application information (whether applied or not), adaptive loop filter coefficient, adaptive loop filter tap, adaptive loop filter shape/form, or adaptive loop filter index stored in the line buffer, as the adaptive loop filter application information (whether applied or not), adaptive loop filter coefficient, an adaptive loop filter tap, adaptive loop filter shape/form, or adaptive loop filter index of a neighboring block to be used for processing of the current block and uses the set information for in-loop filtering of the current block. In addition, when the current block is adjacent to a boundary of a CTU, slice, tile, or tile group, the encoding apparatus or the decoding apparatus sets the adaptive loop filter application information (whether applied or not), adaptive loop filter coefficient, adaptive loop filter tap, adaptive loop filter shape/form, or adaptive loop filter index value of the current block, as the adaptive loop filter application information (whether applied or not), adaptive loop filter coefficient, adaptive loop filter tap, adaptive loop filter shape/form, or adaptive loop filter index value of a neighboring block and saves it in the line buffer.

In another example, when a neighboring block is present outside a row or column boundary of the current CTU, the encoding apparatus or the decoding apparatus sets the neighboring block's motion vector or motion vector difference stored in the line buffer, as the motion vector or motion vector difference of a neighboring block to be used for processing of the current block, and uses the set information for inter prediction of the current block. In addition, when the current block is adjacent to a boundary of a CTU, a slice, a tile, or a tile group, the encoding apparatus or the decoding apparatus calculates a statistical value of the motion vector values or the motion vector difference values of neighboring blocks of the current block and saves the statistical value in the line buffer.

In a further example, when a neighboring block is present outside a row or column boundary of the current CTU, the encoding apparatus or the decoding apparatus sets the neighboring block's luma intra prediction mode or the neighboring block's chroma intra prediction mode stored in the line buffer as the luma intra prediction block or the chroma intra prediction block of a neighboring lock to be used for processing of the current block and uses the set information for intra prediction of the current block. When the current block is adjacent to a boundary of a CTU, a slice, a tile, or a tile group, the encoding apparatus or the decoding apparatus calculates a statistical value of the luma intra prediction modes or the chroma intra prediction modes of neighboring blocks of the current block and saves the statistical value in the line buffer.

In a further example when a neighboring block is present outside a row or column boundary of the current CTU, the encoding apparatus or the decoding apparatus sets the neighboring block's reconstructed luma sample, the neighboring block's reconstructed chroma sample, the neighboring block's residual luma sample, or the neighboring block's residual chroma sample stored in the line buffer, as the reconstructed luma sample, the reconstructed chroma sample, the reconstructed residual luma sample, or the reconstructed residual chroma sample of a neighboring block to be used for processing of the current block, and uses the set information for the intra prediction of the current block. When the current block is adjacent to a boundary of a CTU, a slice, a tile, or a tile group, the encoding apparatus or the decoding apparatus calculates a statistical value of the reconstructed luma samples, the reconstructed chroma samples, the residual luma samples, or the residual chroma samples of neighboring blocks and saves the statistical value in the line buffer.

In the examples, the statistical value is any one of the median value, the minimum value, the maximum value, the mean value, the weighted average value, or the mode value.

For example, the encoding apparatus or the decoding apparatus sets a luma block's motion vector stored in the memory as the motion vector of a luma block corresponding to a chroma block within the current block and uses the determined motion vector in the process of inter prediction of the chroma block. Regarding the motion vector of the luma block within the current block, the encoding apparatus or the decoding apparatus calculates a statistical value of the motion vectors of neighboring luma blocks adjacent to the current block and saves the statistical value in the memory.

Alternatively, the encoding apparatus or the decoding apparatus sets a luma block's intra prediction mode stored in the memory, as the intra prediction mode of a luma block corresponding to a chroma block within the current block and uses the intra prediction mode in the process of intra prediction of the chroma block. Regarding the intra prediction mode of the luma block within the current block, the encoding apparatus or the decoding apparatus calculates a statistical value of the intra prediction modes of neighboring luma blocks adjacent to the current block and saves the statistical value in the memory.

Alternatively, the encoding apparatus or the decoding apparatus sets a chroma block's intra prediction mode stored in the memory as the intra prediction mode of a chroma block corresponding to a luma block within the current block, and uses the set information in the process of intra prediction of the luma block of the current block. Regarding the intra prediction mode of the chroma block within the current block, the encoding apparatus or the decoding apparatus calculates a statistical value of the intra prediction modes of chroma blocks adjacent to the current block and saves the statistical value in the memory.

Further alternatively, the encoding apparatus or the decoding apparatus sets a first-component chroma block's intra prediction mode stored in the memory as the intra prediction mode of a first-component chroma block corresponding to a second-component chroma block within the current block, and uses the set information for intra prediction of the second-component chroma block. In addition, regarding the intra prediction mode of the first-component chroma block within the current block, the encoding apparatus or the decoding apparatus calculates a statistical value of the intra prediction modes of first-component chroma blocks adjacent to the current block and saves the statistical value in the memory.

Further alternatively, the encoding apparatus or the decoding apparatus sets a second-component chroma block's intra prediction mode stored in the memory as the intra prediction mode of a second-component chroma block corresponding to a first-component chroma block within the current block, and uses the set information for intra prediction of the first-component chroma block. Regarding the intra prediction mode of the second-component chroma block within the current block, the encoding apparatus or the decoding apparatus calculates a statistical value of the intra prediction modes of second-component chroma blocks adjacent to the current block and saves the statistical value in the memory.

Further alternatively, the encoding apparatus or the decoding apparatus sets a luma block's reconstructed luma sample or residual luma sample stored in the memory as the reconstructed luma sample or residual luma sample of a luma block corresponding to a chroma block within the current block and uses the set information for intra prediction of the chroma block. Regarding the reconstructed luma samples or residual luma samples of the luma block within the current block, the encoding apparatus or the decoding apparatus calculates a statistical value of at least one reconstructed luma sample or at least one residual luma sample among neighboring samples adjacent to the current sample and saves the statistical value in memory.

Further alternatively, the encoding apparatus or the decoding apparatus sets a reconstructed chroma sample or residual chroma sample of a chroma block, stored in the memory, as the reconstructed chroma sample or the residual chroma sample of a chroma block corresponding to a luma block within the current block, and uses the set information for intra prediction of the luma block. In addition, regarding the reconstructed chroma samples or the residual chroma samples of the chroma block within the current block, the encoding apparatus or the decoding apparatus calculates a statistical value of at least one reconstructed chroma sample or at least one residual chroma sample among neighboring samples adjacent to the current sample, and saves the statistical value in the memory.

Further alternatively, the encoding apparatus or the decoding apparatus sets a reconstructed first-component chroma sample or a residual first-component chroma sample of a first-component chroma block, stored in the memory, as the reconstructed first-component chroma sample or the residual first-component chroma sample of a first-component chroma block corresponding to a second-component chroma block within the current block and uses the set information for intra prediction of the second-component chroma block. Regarding the reconstructed first-component chroma sample or the residual first-component chroma sample of the first-component chroma block within the current block, a statistical value of at least one reconstructed first-component chroma sample or at least one residual first-component chroma sample among neighboring samples adjacent to the current sample is calculated, and the statistical value is saved in the memory.

Further alternatively, the encoding apparatus or the decoding apparatus sets a reconstructed second-component chroma sample or a residual second-component chroma sample of a second-component chroma block, stored in the memory, as the reconstructed second-component chroma sample or the residual second-component chroma sample of a second-component chroma block corresponding to a first-component chroma block within the current block, and uses the set information for intra prediction of the first-component chroma block. In addition, regarding the reconstructed second-component chroma sample or the residual second-component chroma sample of the second-component chroma block within the current block, the encoding apparatus or the decoding apparatus calculates a statistical value of at least reconstructed second-component chroma sample or at least one residual second-component chroma sample among neighboring samples adjacent to the current sample and saves the statistical value in the memory.

In the examples described above, the statistical value is any one of the median value, the minimum value, the maximum value, the mean value, the weighted average value, and the mode value.

The encoding apparatus or the decoding apparatus sets at least one piece of the neighboring block's information stored in the line buffer or memory as at least one piece of the information of a neighboring block to be used for processing of the current block and uses the set information in the process of encoding/decoding the current block.

For example, the encoding apparatus or the decoding apparatus saves at least one odd number among pieces of the information of the current block in the line buffer or memory. For example, the encoding apparatus or the decoding apparatus performs an AND operation of a binary value of 1 and at least one piece of the information of the current block and saves the resulting value of the AND operation in the line buffer or memory. That is, an AND operation is performed between a binary value of 1 and a least significant bit (LSB) value of at least one piece of the information of the current block. Here, the process in which the encoding apparatus or the decoding apparatus performs the AND operation and saves the resulting value of the AND operation means that at least one odd number among the pieces of the information of the current block is saved in the line buffer or memory.

Alternatively, the encoding apparatus or the decoding apparatus saves at least one even number of the pieces of the information of the current block in the line buffer or memory. For example, the encoding apparatus or the decoding apparatus performs an AND operation of a binary value of 0 and at least one piece of the information of the current block, and saves the resulting value of the AND operation in the line buffer or memory. That is, an AND operation is performed between a binary value of 0 and an LSB value of at least one piece of the information of the current block. Here, the process in which the encoding apparatus or the decoding apparatus performs the AND operation and saves the resulting value of the AND operation means that at least one even number among the pieces of the information of the current block is saved in the line buffer or memory.

In another example, the encoding apparatus or the decoding apparatus converts at least one value of the pieces of the information of the current block and saves the resulting value of the conversion in the line buffer or memory. The encoding apparatus or the decoding apparatus converts the motion vector value of the current block into a floating-point number representation and saves the floating-point number representation value in the line buffer or memory. The floating-point number representation value is converted back into the motion vector value and is used for inter prediction of a neighboring block.

For example, the encoding apparatus or the decoding apparatus converts a motion vector value represented by N bits into an M-bit floating-point number. Here, the M bits are composed of R mantissa bits and P exponent bits. In addition, the encoding apparatus or the decoding apparatus converts a motion vector value of a current block to a floating-point number representation value, and saves the floating-point number representation value resulting from the conversion in the line buffer or memory. For example, N, M, R, and P are positive integers and are 18, 10, 6, and 4, respectively.

In another example, when at least one value of the information of the current block is included in a specific range, the encoding apparatus or the decoding apparatus saves a representative value of the specific range of the block information in the line buffer or memory.

For example, when the value of the luma intra prediction mode of the current block is included in a range of from −V to U that are values indicating vertical modes, the encoding apparatus or the decoding apparatus sets the value of the luma intra prediction mode of the current block as a value indicating a vertical mode and saves the set information in the line buffer or memory. Here, V and U are positive integers. For example, when the value of the luma intra prediction mode of the current block is 23, V and U each are 4, and the value indicating the vertical mode is 26, 23 is included in the range of from 22 to 30. Therefore, the encoding apparatus or the decoding apparatus sets the value of the intra prediction mode of the current block to 26 and saves it in the line buffer.

In another example, when at least one value of the information of the current block is not included in a specific range, the encoding apparatus or the decoding apparatus sets the minimum value or the maximum value of the specific range as the information of the current block and saves it in the line buffer or memory.

For example, when the value of the scaled motion vector of the current block obtained by the inter prediction process is not included within a specific range, the encoding apparatus or the decoding apparatus sets the value of the scaled motion vector of the current block to the minimum value or the maximum value of the predetermined range. Specifically, when the value of the scaled motion vector of the current block is smaller than the minimum value of the predetermined range, the encoding apparatus or the decoding apparatus sets the value of the scaled motion vector of the current block to the minimum value of the predetermined range. In addition, when the value of the scaled motion vector of the current block is larger than the maximum value of the predetermined range, the encoding apparatus or the decoding apparatus sets the value of the scaled motion vector of the current block to the maximum value of the predetermined range. For example, the predetermined range is $-2^N$ to $2^N-1$. Here, N is a positive integer and is, for example, 17. When N is 17, $-2^N$ is equal to −131072, and $2^N-1$ is equal to 131071.

In another example, the encoding apparatus or the decoding apparatus performs an inverse operation on at least one motion vector among motion vectors of blocks within a reference picture, slice, tile, or tile group, sets the resulting value of the inverse operation as the motion vector of a neighboring block, and uses it in the encoding/decoding process of the current block. In addition, an operation is performed on the motion vector of the current block and the resulting value of the operation is saved in the line buffer or memory. For example, the inverse operation may be a left shift operation by a predetermined value M, and the operation may be a right shift operation by a predetermined value N.

The reference picture, slice, tile, or tile group may be a co-located picture, slice, tile, or tile group. In addition, the resulting value of the operation performed on the motion vector is saved for each picture, slice, tile, or tile group. In addition, the saved motion vector used in the encoding/decoding process of the current block is referred to as a temporal motion vector. The buffer/memory in which the temporal motion vector is saved is referred to as a temporal motion vector buffer/memory. Although a case where the line buffer/memory has been described in the above embodiments, at least one of the above embodiments can be used when a motion vector is saved in a temporal motion vector buffer/memory.

In addition, in the above-described embodiments, when the motion vector of the current block is saved in the line buffer/memory, a motion vector that has not undergone correction, refinement or modification is saved in the line buffer/memory. Here, the uncorrected, unrefined or non-modified motion vector is referred to as a pre-correction motion vector. That is, the motion vector that is selected from the motion vector candidate list, the merge candidate list, or the sub-block-based merge candidate list is saved before motion compensation is performed on the current block. The correction means that a motion vector value is changed according to a certain rule while or before motion compensation is performed by the encoding apparatus or the decoding apparatus.

In addition, in the above-described embodiments, when the motion vector of the current block is saved in the temporal motion vector buffer/memory, a corrected motion vector resulting from the motion vector correction is saved in the temporal motion vector buffer/memory. Here, this motion vector is referred to as a post-correction motion vector. That is, a motion vector can be saved while or before motion compensation is performed on the current block.

When a current block uses a block vector and is encoded/decoded with an intra block copy mode in which a reconstructed region within a current picture is used as a prediction block, at least one of the embodiments related to a motion vector is applied to the block vector of the current block. That is, modifications to the above-described embodiments, in which the motion vector is replaced with the block vector, can be used when a current block has an intra block copy mode.

In the above-described embodiments, when an operation or an inverse operation is performed on a motion vector, the operation or the inverse operation may be performed on at least one of the x component and the y component of the motion vector. In the above embodiments, when the first-component chroma is Cb, the second-component chroma is Cr, and vice versa. In the above-described embodiments, the left shift operation means up-sampling or dequantization of a particular value, and the right shift operation means down-sampling, sub-sampling, or quantization of a particular value. In the above-described embodiments, the sample means at least one of a reconstructed luma sample, a reconstructed chroma sample, a residual luma sample, a residual chroma sample, a luma transform coefficient, a chroma transform coefficient, and a luma quantization level. In the above-described embodiments, the memory means at least one of a CTU-based on-chip memory, a block-based on-chip memory, a line buffer, and an external memory.

For example, when the information of the current block is a luma intra prediction mode or a chroma intra prediction mode in the above-described embodiments, the encoding apparatus or the decoding apparatus uses the above-described embodiments only when the intra prediction mode of the current block is not a non-directional mode such as DC mode or PLANAR mode but a directional mode such as a diagonal mode, a vertical mode, or horizontal mode.

In another example, when the information of the current block is a luma intra picture prediction mode or a chroma intra prediction mode in the above-described embodiments, the encoding apparatus or the decoding apparatus uses the above-described embodiments only when the intra prediction mode of the current block is neither DC mode, PLANAR mode, vertical mode, nor horizontal mode but a diagonal mode among the directional modes.

For example, when the information of a current block is a motion vector, the encoding apparatus or the decoding apparatus scales a motion vector with respect to a specific reference picture, performs the above-described operation, and saves the resulting value of the operation in the line buffer/memory. Here, a specific reference picture is a picture designated by a reference picture index that is a fixed value preset in the encoding apparatus or the decoding apparatus. For example, the encoding apparatus or the decoding apparatus sets a picture indicated by a reference picture index of 0 as a specific reference picture.

When the information of a current block is a motion vector in the above-described embodiments, the neighboring block refers to a spatial neighboring block, a temporal neighboring block, or both.

In the above-described embodiments, the encoding apparatus or the decoding apparatus entropy-encodes/decodes information (at least one of Q, R, and K) indicating how many bits are occupied by at least one piece of the information of a block in the line buffer, at one or more levels selected from among a video parameter set, a sequence parameter set, a picture parameter set, an adaptation parameter set, a slice header, a tile header, a tile group header, a CTU, and a block. The encoding apparatus or the decoding apparatus can determine the size of at least one piece of the information of a block, which is stored in the line buffer, on the basis of this information.

In the above-described embodiments, the encoding apparatus or the decoding apparatus entropy-encodes/decodes information (at least one of Q, R, and K) indicating a shift value when at least one piece of the information of a block is saved in or loaded from the line buffer, at one or more levels selected from among a video parameter set, a sequence parameter set, a picture parameter set, an adaptation parameter set, a slice header, a tile header, a tile group header, a CTU, and a block. The encoding apparatus or the decoding apparatus saves at least one piece of the information of a block in the line buffer or load it from the line buffer on the basis of this information. That is, the information may be information that is required to perform the operation and the inverse operation that are described above.

In the above-described embodiments, the stored motion vector is used for intra prediction, inter prediction, transform, inverse transform, quantization, dequantization, entropy-encoding/decoding, and in-loop filtering. In addition, the stored motion vector is used as a spatial motion vector or a temporal motion vector.

In addition, in the above-described embodiments, the stored samples are used in the process of intra prediction, inter prediction, transform, inverse transformation, quantization, and dequantization.

In addition, in the above-described embodiments, the stored intra prediction mode is used in the process of intra prediction, inter prediction, transform, inverse transform, quantization, dequantization, entropy-encoding/decoding, and in-loop filtering.

In the above-described embodiments, when the information of a current block is saved in the line buffer or memory, the line buffer size or the memory size can be reduced by reducing the bit depth.

In the above-described embodiments, when the unit size stored in the line buffer or the memory is increased when the information of a current block is saved in the line buffer or the memory, the number of pieces of the information to be stored in the line buffer or the memory is reduced and accordingly the buffer size is reduced.

In the above-described embodiments, when the encoding apparatus or the decoding apparatus calculates a statistical value of the information of the neighboring blocks of the current block or the information of the neighboring samples within the current block and saves the statistical value in the line buffer, since the representative value of the information of multiple blocks or the representative value of the information of multiple samples is saved in the line buffer or the memory. Thus, an area occupied by block information stored in the line buffer or the memory is reduced.

In the above-described embodiments, when a block is divided into sub-blocks, information of the block and information of the sub-block have different values.

When a block is divided into sub-blocks, an M×N sub-block may be divided into L blocks smaller than a J×K size. For example, a 16×16 block can be divided into 16 sub-blocks having a 4×4 size. For example, a 16×8 block can be divided into 8 sub-blocks having a 4×4 size. For example, an 8×8 block can be divided into 4 sub-blocks having a 4×4 size. For example, a 32×32 block can be divided into 4 sub-blocks having an 8×8 size. For example, a 32×8 block can be divided into 4 sub-blocks having an 8×8 size.

Here, M, N, J, K, and L are each positive integers. Here, M is equal to or greater than J and N is equal to or greater than K. In addition, M, N, J, K, and L are values preset in the encoding apparatus and the decoding apparatus or values signaled from the encoding apparatus to the decoding apparatus.

Here, the sub-block partition is one of quad-tree partition, binary-tree partition, horizontal binary-tree partition, vertical binary-tree partition, symmetric binary-tree partition, and asymmetric binary-tree partition.

In the above-described embodiments, after at least one piece of the block information for the entire block is saved, at least one piece of the stored block information may be substituted by at least one piece of sub-block-based block information that is derived from sub-blocks obtained by division of a block. For example, the sub-block-based block information refers to at least one piece of motion information, such as a motion vector, a reference picture index, and an inter prediction indicator. At least one piece of the sub-block-based block information that is information of sub-blocks produced by division of a block refers to at least one piece of the information of a sub-block. The above-described process can be performed on at least one of the sub-blocks located at specific positions within a block or on all of the sub-blocks within a block.

In the embodiments described above, the encoding apparatus or the decoding apparatus may not save at least one piece of the block information for the whole block. Instead, the encoding apparatus or the decoding apparatus may divide a block into sub-blocks and then save at least one piece of the block information for each sub-block. In this case, a sub-block having the sub-block-based block information is indicated by information signaled from the encoding apparatus or by an index predefined in the encoding apparatus and the decoding apparatus. The above-described process is performed on at least one of the sub-blocks located at specific positions within a block or on all of the sub-blocks within a block.

In the above-described embodiments, after at least one piece of the block information for all the blocks is saved, at least one piece of the stored block information is substituted by at least one piece of block information used to allocate information of sub-blocks produced by division of the block. For example, information of a block used to allocate block information of sub-blocks refers to a seed vector or a control point vector used to derive at least one piece of the motion information, such as a motion vector, a reference picture index, and an inter prediction indicator for each sub-block by using an affine model. The above-described process is performed on at least one of the sub-blocks located at specific positions within a block or on all of the sub-blocks within a block.

In the above-described embodiments, the encoding apparatus or the decoding apparatus divides a block into sub-blocks and saves at least one piece of block information used to allocate information of the sub-blocks, instead of saving at least one piece of the block information for the whole block. The above-described processes can be performed on one or more sub-blocks located at one or more specific positions within a block or performed on all of the sub-blocks within a block.

The sub-block-based information, which is block information derived from sub-blocks into which a block is divided, is derived by using block information used to allocate the block information per sub-block.

In the above-described embodiments, a seed vector or a control position vector is saved on a per sub-block basis, and the saved seed vector or the control position vector can be replaced by the information of a sub-block. The above-described process is performed on one or several sub-blocks located at specific positions within a block or on all of the sub-blocks within a block.

In the above-described embodiments, the encoding apparatus or the decoding apparatus may store at least one piece of the sub-block-based block information instead of the seed vector or the control position vector. The above-described process is performed on one or several sub-blocks located at specific positions within a block or on all of the sub-blocks within a block.

The above-described embodiments are selectively used according to the size of at least one of a coding block, a prediction block, a block, a unit, a tile, and a tile group. Here, the size is a minimum size, a maximum size, or a fixed size which is used to determine which of the above-described embodiments will be applied. Alternatively, among the above-described embodiments, a first embodiment is applicable to the case where the size is a first size, and a second embodiment is applicable to the case where the size is a second size. That is, which of the above-described embodiments is applicable is determined depending on the size. For example, the above-described embodiments are used when the size is equal to or larger than the minimum size and is equal to or smaller than the maximum size. That is, the above-described embodiments are used only when the block size is within a certain range.

For example, when the size of the current block is equal to or larger than N×N, the above-described embodiments can be used. Alternatively, the above-described embodiments can be used when the block size is equal to or smaller than N×N. Alternatively, the above-described embodiment can be used when the block size is equal to or larger than N×N and is equal to or smaller than M×M. Here, N and M are positive integers, and M may be a number less than M. Specifically, N and M have values selected from among 4, 8, 16, 32, 64, and 128, but the values of N and M are not limited thereto.

Specifically, the above embodiments can be used only when the size of the current block is 8×8 or larger. Alternatively, the above embodiments can be used only when the size of the current block is 16×16 or larger. Alternatively, the above embodiments can be used only when the size of the current block is 32×32 or larger. Alternatively, the above embodiments can be used only when the size of the current block is 64×64 or larger. Alternatively, the above embodiments can be used only when the size of the current block is 128×128 or larger. Alternatively, the above embodiments can be used only when the size of the current block is 4×4. Alternatively, the above embodiments can be used only when the size of the current block is 8×8 or smaller. Alternatively, the above embodiments can be used only when the size of the current block is 16×16 or smaller. Alternatively, the above embodiments can be used when the size of the current block ranged from 8×8 to 16×16. For example, the above embodiments can be used when the size of the current block ranges from 16×16 to 64×64.

Whether the above-described embodiments can be used is determined depending on the temporal layer. An identifier is signaled to indicate a temporal layer at which the above-described embodiments can be used, and the above-described embodiments can be used at the temporal layer specified by the signaled identifier. The identifier herein is defined as an indicator indicating the minimum layer and/or maximum layer at which the above-described embodiments can be used, or defined as an indicator indicating a specific layer at which the above-described embodiments can be used.

For example, the above-described embodiments are applicable only to the case where the temporal layer of the current image is the lowest layer. For example, the above-described embodiments are applicable only to the case where the identifier of the temporal layer of the current image is 0. For example, the above-described embodiments are applicable only to the case where the identifier of the temporal layer of the current image is 1 or greater. For example, the above-described embodiments are applicable only to the case where the temporal layer of the current image is the highest layer.

In the reference picture list construction process and the reference picture list modification process in the above-described embodiments, at least one of the picture lists L0, L1, L2, and L3 is used as a reference picture set.

According to the above-described embodiment, when a boundary strength in a deblocking filter is calculated, the encoding apparatus or the decoding apparatus uses a motion vector stored in the line buffer or a memory.

The above-described embodiments can be used when the motion vector precision is 16-pel, 8-pel, 4-pel, integer-pel, ⅛-pel, 1/16-pel, 1/32-pel, or 1/64-pel. In the encoding/decoding process of the current block, the pixel unit (precision) of the motion vector can be adaptively selected.

A slice type, a tile type, and a tile group type to which the above-described embodiments can be applied may be defined. That is, whether the above-described embodiments are applicable can be determined depending on the slice type, the tile type, and the tile group type.

Whether the above-described embodiments are applicable can be determined depending on the shape (square or non-square) of a block.

An image may be encoded/decoded by using at least one or a combination of at least one among the above embodiments.

A sequence of applying to above embodiment may be different between an encoder and a decoder, or the sequence applying to above embodiment may be the same in the encoder and the decoder.

The order of applying the embodiment may be different between the encoder and the decoder, and the order of applying the embodiment may be the same in the encoder and the decoder The above embodiment may be performed on each luma signal and chroma signal, or the above embodiment may be identically performed on luma and chroma signals.

A block form to which the above embodiments of the present invention are applied may have a square form or a non-square form.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. A method of decoding an image, the method comprising:
   determining a first sub-block merge candidate based on a left block of a current block;
   determining whether the current block is adjacent to an upper boundary of a current coding tree block of the current block;
   determining a second sub-block merge candidate based on an upper block of the current block;
   determining sub-block merge information of the current block from a sub-block merge candidate list including the first sub-block merge candidate and the second sub-block merge candidate; and
   performing affine prediction of the current block based on the sub-block merge information,
   wherein in response to that the current block is adjacent to the upper boundary of the current coding tree block of the current block, the second sub-block merge candidate is determined based on a motion vector corresponding to a location adjacent to the upper boundary of a current coding tree block of the current block, and
   wherein the location adjacent to the upper boundary is included in the upper block of the current block.

2. The method of claim 1, wherein a size of a sub-block of the current block is 4×4.

3. The method of claim 1, wherein the location adjacent to the upper boundary of the current coding tree block comprises a lower-left location of the upper block and a lower-right location of the upper block.

4. The method of claim 1,
   wherein the first sub-block merge candidate is determined based on a control point motion vector that is used for affine prediction of the left block in response to that affine prediction is applied to the left block, and
   wherein the second sub-block merge candidate is determined based on a control point motion vector that is used for affine prediction of the upper block in response to that affine prediction is applied to the upper block.

5. The method of claim 1, wherein the sub-block merge candidate list further includes a temporal sub-block merge candidate from a temporal reference block of the current block.

6. The method of claim 5, wherein the temporal sub-block merge candidate comprises a motion vector of the temporal reference block which location is corresponding to a location of a sub-block of the current block.

7. The method of claim 6, wherein a size of a sub-block of the current block is 8×8 in case of determination of the temporal sub-block merge candidate.

8. The method of claim 1, wherein a precision of a motion vector of the sub-block merge information is determined by applying at least one of left shift operation and right shift operation to the sub-block merge information of the first sub-block merge candidate or the second sub-block merge candidate.

9. The method of claim 1, wherein the affine prediction of the current block is performed by:
   determining motion vectors of sub-blocks of the current block based on the sub-block merge information; and
   performing the affine prediction of the current block by predicting the sub-blocks of the current block based on the motion vectors of the sub-blocks of the current block.

10. A method of encoding an image, the method comprising:
    determining a first sub-block merge candidate based on a left block of a current block;
    determining whether the current block is adjacent to an upper boundary of a current coding tree block of the current block;
    determining a second sub-block merge candidate based on an upper block of the current block;
    determining sub-block merge information of the current block from a sub-block merge candidate list including the first sub-block merge candidate and the second sub-block merge candidate; and
    performing affine prediction of the current block based on the sub-block merge information,
    wherein in response to that the current block is adjacent to the upper boundary of the current coding tree block of the current block, the second sub-block merge candidate is determined based on a motion vector corresponding to a location adjacent to the upper boundary of the current coding tree block, and
    wherein the location adjacent to the upper boundary is included in the upper block of the current block.

11. The method of claim 10, wherein a size of a sub-block of the current block is 4×4.

12. The method of claim 10, wherein the location adjacent to the upper boundary of the current coding tree block comprises a lower-left location of the upper block and a lower-right location of the upper block.

13. The method of claim 10,
    wherein the first sub-block merge candidate is determined based on a control point motion vector that is used for affine prediction of the left block in response to that affine prediction is applied to the left block, and
    wherein the second sub-block merge candidate is determined based on a control point motion vector that is used for affine prediction of the upper block in response to that affine prediction is applied to the upper block.

14. The method of claim 10, wherein the sub-block merge candidate list further includes a temporal sub-block merge candidate from a temporal reference block of the current block.

15. The method of claim 14, wherein the temporal sub-block merge candidate comprises a motion vector of the temporal reference block which location is corresponding to a location of a sub-block of the current block, wherein a size of a sub-block of the current block is 8×8 in case of determination of the temporal sub-block merge candidate.

16. The method of claim 10, wherein a precision of a motion vector of the sub-block merge information is determined by applying at least one of left shift operation and right shift operation to the sub-block merge information of the first sub-block merge candidate or the second sub-block merge candidate.

17. The method of claim 10, wherein
the affine prediction of the current block is performed by:
determining motion vectors of sub-blocks of the current block based on the sub-block merge information; and
performing the affine prediction of the current block by predicting the sub-blocks of the current block based on the motion vectors of the sub-blocks of the current block.

18. A non-transitory storage medium containing a bit stream generated by an image encoding method, the method comprising:
determining a first sub-block merge candidate based on a left block of a current block;
determining whether the current block is adjacent to an upper boundary of a current coding tree block of the current block;
determining a second sub-block merge candidate based on an upper block of the current block;
determining sub-block merge information of the current block from a sub-block merge candidate list including the first sub-block merge candidate and the second sub-block merge candidate; and
performing affine prediction of the current block based on the sub-block merge information,
wherein in response to that the current block is adjacent to the upper boundary of the current coding tree block of the current block, the second sub-block merge candidate is determined based on a motion vector corresponding to a location adjacent to the upper boundary of the current coding tree block, and
wherein the location adjacent to the upper boundary is included in the upper block of the current block.

* * * * *